(12) United States Patent
Sasaki et al.

(10) Patent No.: US 8,509,038 B1
(45) Date of Patent: Aug. 13, 2013

(54) NEAR-FIELD LIGHT GENERATOR AND THERMALLY-ASSISTED MAGNETIC RECORDING HEAD

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/660,526

(22) Filed: Oct. 25, 2012

(51) Int. Cl.
*G11B 11/00* (2006.01)

(52) U.S. Cl.
USPC .................................... 369/13.33; 369/13.13

(58) Field of Classification Search
USPC .......... 369/13.13, 13.33, 13.32, 13.02, 13.17, 369/13.24, 112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| 8,077,559 | B1 * | 12/2011 | Miyauchi et al. | 369/13.33 |
| 8,116,175 | B2 * | 2/2012 | Chou et al. | 369/13.33 |
| 8,125,858 | B2 * | 2/2012 | Hara et al. | 369/13.33 |
| 2010/0172220 | A1 | 7/2010 | Komura et al. | |
| 2011/0205860 | A1 * | 8/2011 | Chou et al. | 369/13.24 |
| 2012/0188859 | A1 * | 7/2012 | Hara et al. | 369/13.33 |

FOREIGN PATENT DOCUMENTS

JP    A-2011-086361    4/2011

* cited by examiner

*Primary Examiner* — Tan X Dinh
(74) *Attorney, Agent, or Firm* — Oliff & Berridge, PLC

(57) ABSTRACT

A near-field light generator includes a waveguide and a plasmon generator. The waveguide has a core and a cladding. The core has first and second evanescent light generating surfaces disposed such that the plasmon generator is interposed therebetween. The plasmon generator has an outer surface, the outer surface including: a front end face; a first plasmon exciting part that is opposed to the first evanescent light generating surface with a predetermined spacing therebetween; and a second plasmon exciting part that is opposed to the second evanescent light generating surface with a predetermined spacing therebetween.

9 Claims, 21 Drawing Sheets

NEAR-FIELD LIGHT GENERATOR AND THERMALLY-ASSISTED MAGNETIC RECORDING HEAD

BACKGROUND OF THE INVENTION

1. Field of the Invention

The present invention relates to a near-field light generator including a waveguide and a plasmon generator, and to a thermally-assisted magnetic recording head including the near-field light generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of a recording medium. The slider has a medium facing surface that faces the recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of a recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near the medium facing surface of the slider.

JP-A-2011-86361 discloses a thermally-assisted magnetic recording head configured to excite plasmons on a plasmon generator (a light emitting part) by directly irradiating the plasmon generator with laser light.

U.S. Patent Application Publication No. 2010/0172220 A1 discloses a thermally-assisted magnetic recording head in which a plasmon generator (a surface plasmon antenna) is arranged to face the outer surface of a waveguide (a core) with a predetermined distance therebetween, so that light propagating through the waveguide is totally reflected at the outer surface of the waveguide to thereby generate evanescent light that is used to excite surface plasmons on the plasmon generator.

The configuration in which the plasmon generator is directly irradiated with laser light to excite plasmons on the plasmon generator, such as one disclosed in JP-A-2011-86361, has a number of problems as follows. First, this configuration has the problem of low efficiency of transformation of laser light into near-field light because most part of the laser light is reflected at the surface of the plasmon generator or transformed into thermal energy and absorbed by the plasmon generator. Further, this configuration has the problem that the plasmon generator greatly increases in temperature when it absorbs thermal energy, and this may result in corrosion of the plasmon generator. Further, this configuration has the problem that the plasmon generator expands as it increases in temperature, and may thus protrude from the medium facing surface to cause damage to a recording medium or to itself.

The configuration in which evanescent light is used to excite surface plasmons on a plasmon generator, such as one disclosed in U.S. Patent Application Publication No. 2010/0172220 A1, provides higher efficiency of transformation of laser light into near-field light when compared with the case of directly irradiating the plasmon generator with laser light. This makes it possible to resolve the above-described problems.

The thermally-assisted magnetic recording head disclosed in U.S. Patent Application Publication No. 2010/0172220 A1 has a problem that the ratio of a part of the outer surface of the plasmon generator, the part being opposed to the outer surface of the core, to the entire outer surface of the plasmon generator is small, and it is thus difficult with this head to excite a lot of surface plasmons on the plasmon generator.

OBJECT AND SUMMARY OF THE INVENTION

It is an object of the present invention to provide a near-field light generator and a thermally-assisted magnetic recording head that are configured to excite surface plasmons on a plasmon generator by using evanescent light, and allow a lot of surface plasmons to be excited on the plasmon generator.

A near-field light generator of the present invention includes a waveguide, first and second gap parts, and a plasmon generator. The waveguide includes a core through which light propagates, and a cladding provided around the core. The first and second gap parts are each made of a dielectric material that has a refractive index lower than that of the core. The core has first and second evanescent light generating surfaces disposed such that the plasmon generator is interposed therebetween. The first evanescent light generating surface generates first evanescent light based on the light propagating through the core. The second evanescent light generating surface generates second evanescent light based on the light propagating through the core. The plasmon generator has an outer surface, the outer surface including: a front end face; a first plasmon exciting part that is opposed to the first evanescent light generating surface with a predetermined spacing therebetween; and a second plasmon exciting part that is opposed to the second evanescent light generating surface with a predetermined spacing therebetween. The first gap part is interposed between the first evanescent light generating surface and the first plasmon exciting part. The second gap part is interposed between the second evanescent light generating surface and the second plasmon exciting part.

The plasmon generator is configured so that a first surface plasmon is excited on the first plasmon exciting part through coupling with the first evanescent light, a second surface plasmon is excited on the second plasmon exciting part through coupling with the second evanescent light, the first and second surface plasmons propagate to the front end face, and near-field light is generated from the front end face based on the first and second surface plasmons.

A cross section of the plasmon generator parallel to the front end face, the cross section having a periphery defined in part by the first and second plasmon exciting parts, is in the shape of a quadrangle that is made up of a first side, a second side, a third side, and a fourth side. The first side is defined in its entirety by the first plasmon exciting part. The second side is defined in its entirety by the second plasmon exciting part. The third side connects between one end of the first side and one end of the second side. The fourth side connects between the other end of the first side and the other end of the second side.

In the near-field light generator of the present invention, the aforementioned cross section of the plasmon generator may be in the shape of a rectangle.

In the near-field light generator of the present invention, the core may include a first layer including the first evanescent light generating surface and a second layer including the second evanescent light generating surface. The first gap part, the plasmon generator, and the second gap part may be interposed between the first layer and the second layer.

A thermally-assisted magnetic recording head of the present invention includes: a medium facing surface that faces a recording medium; a main pole that has an end face located in the medium facing surface and produces a write magnetic field for writing data on the recording medium; and the near-field light generator of the present invention. The front end face of the outer surface of the plasmon generator is located in the medium facing surface.

In the thermally-assisted magnetic recording head of the present invention, the aforementioned cross section of the plasmon generator may be in the shape of a rectangle.

In the thermally-assisted magnetic recording head of the present invention, the first evanescent light generating surface, the first gap part, the first plasmon exciting part, the second plasmon exciting part, the second gap part, and the second evanescent light generating surface may be aligned along the direction of travel of the recording medium.

In the thermally-assisted magnetic recording head of the present invention, the first evanescent light generating surface, the first gap part, the first plasmon exciting part, the second plasmon exciting part, the second gap part, and the second evanescent light generating surface may be aligned along the track width direction.

In the thermally-assisted magnetic recording head of the present invention, the core may include a first layer including the first evanescent light generating surface and a second layer including the second evanescent light generating surface. The first gap part, the plasmon generator, and the second gap part may be interposed between the first layer and the second layer. In this case, the first layer and the second layer may be aligned along the direction of travel of the recording medium, and at least part of the main pole may be located between the medium facing surface and one of the first and second layers.

In the near-field light generator and the thermally-assisted magnetic recording head of the present invention, the first and second evanescent light generating surfaces generate the first and second evanescent light, and the first and second surface plasmons are excited on the first and second plasmon exciting parts of the plasmon generator through coupling with the first and second evanescent light. The present invention thus allows the plasmon generator to excite a lot of surface plasmons.

Other and further objects, features and advantages of the present invention will appear more fully from the following description.

DETAILED DESCRIPTION OF THE PREFERRED EMBODIMENTS

First Embodiment

Figure 1:
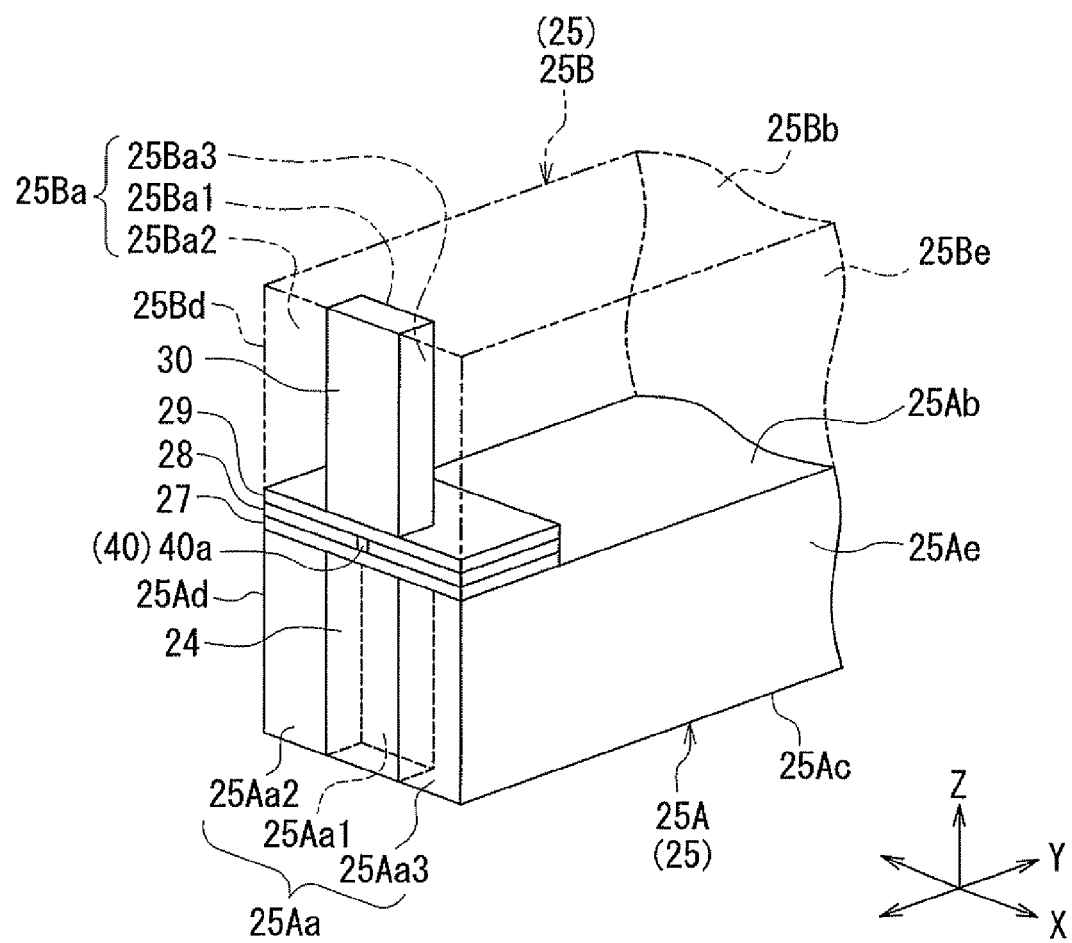
FIG. 1 is a perspective view showing the main part of a thermally-assisted magnetic recording head according to a first embodiment of the invention.
Figure 2:
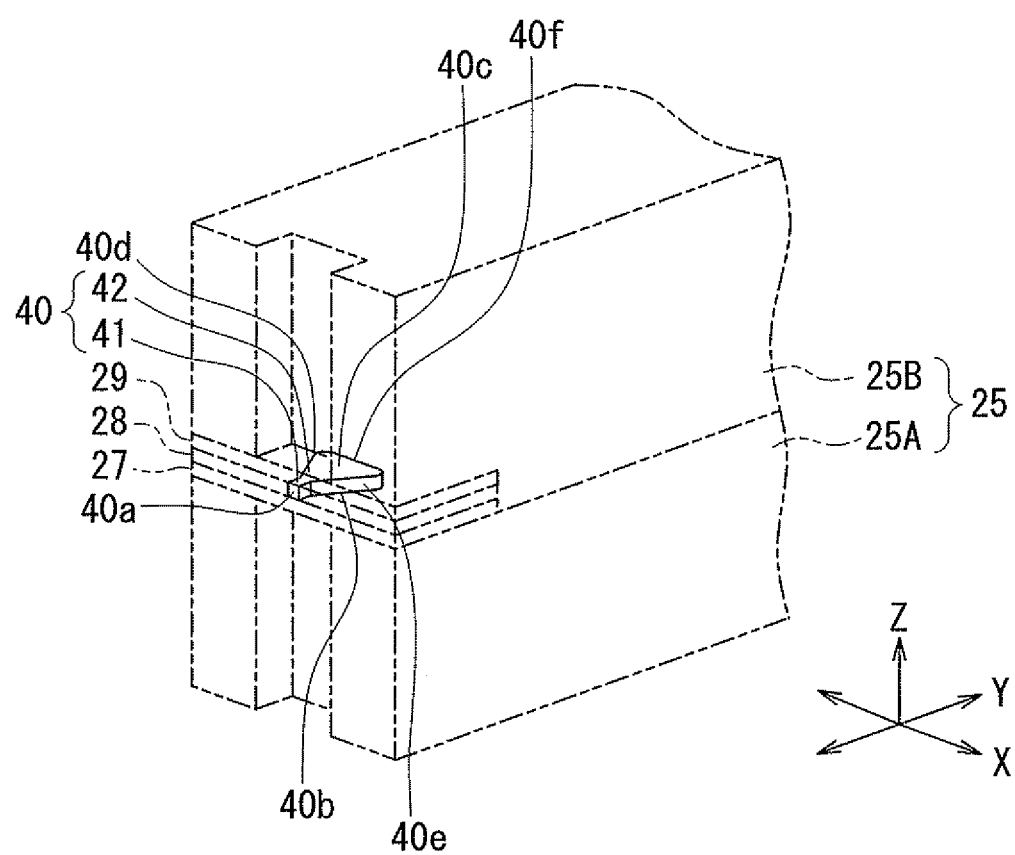
FIG. 2 is a perspective view showing the shape and location of a plasmon generator in the thermally-assisted magnetic recording head according to the first embodiment of the invention.
Figure 3:
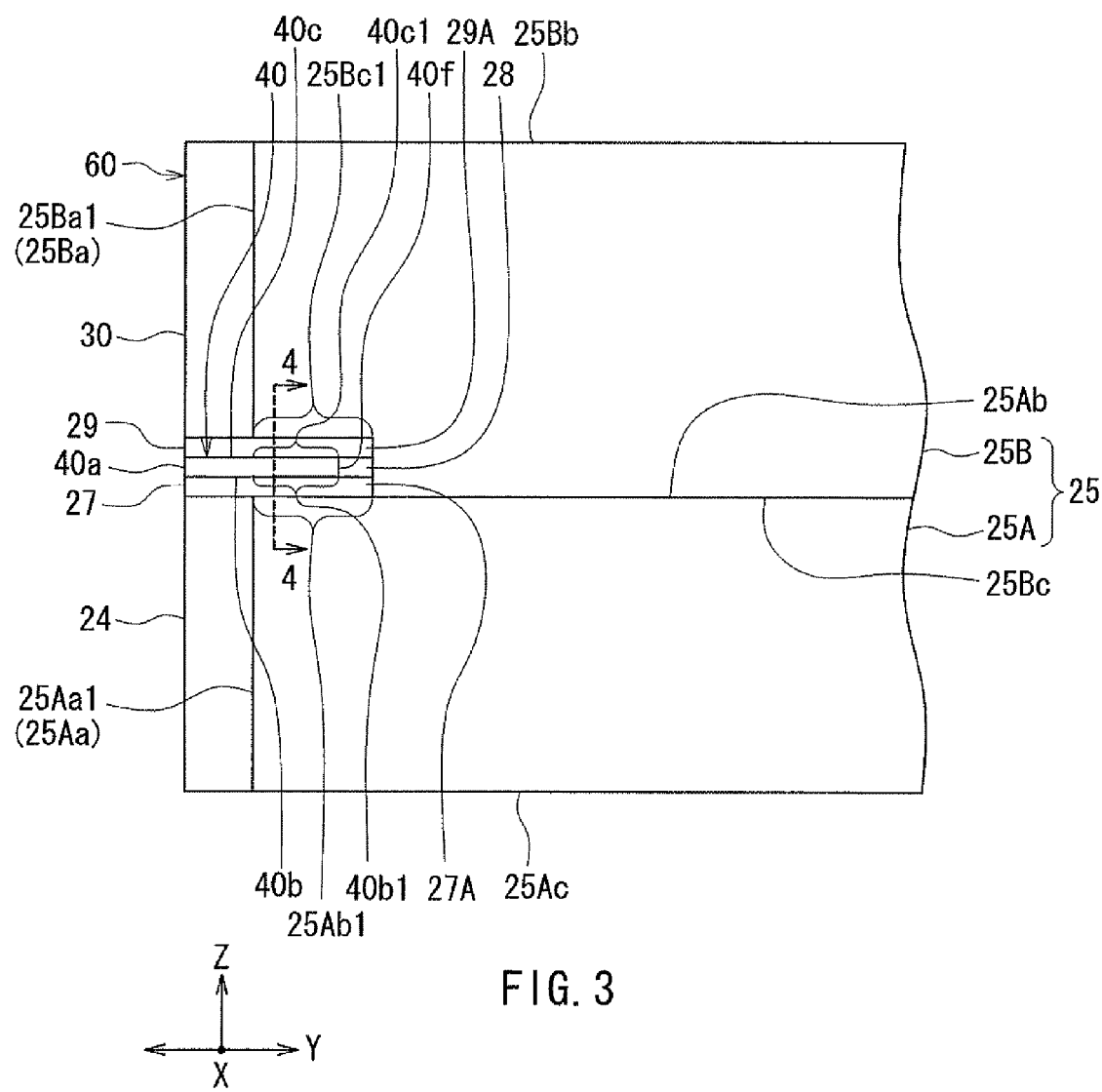
FIG. 3 is a cross-sectional view showing the main part of the thermally-assisted magnetic recording head according to the first embodiment of the invention.
Figure 4:
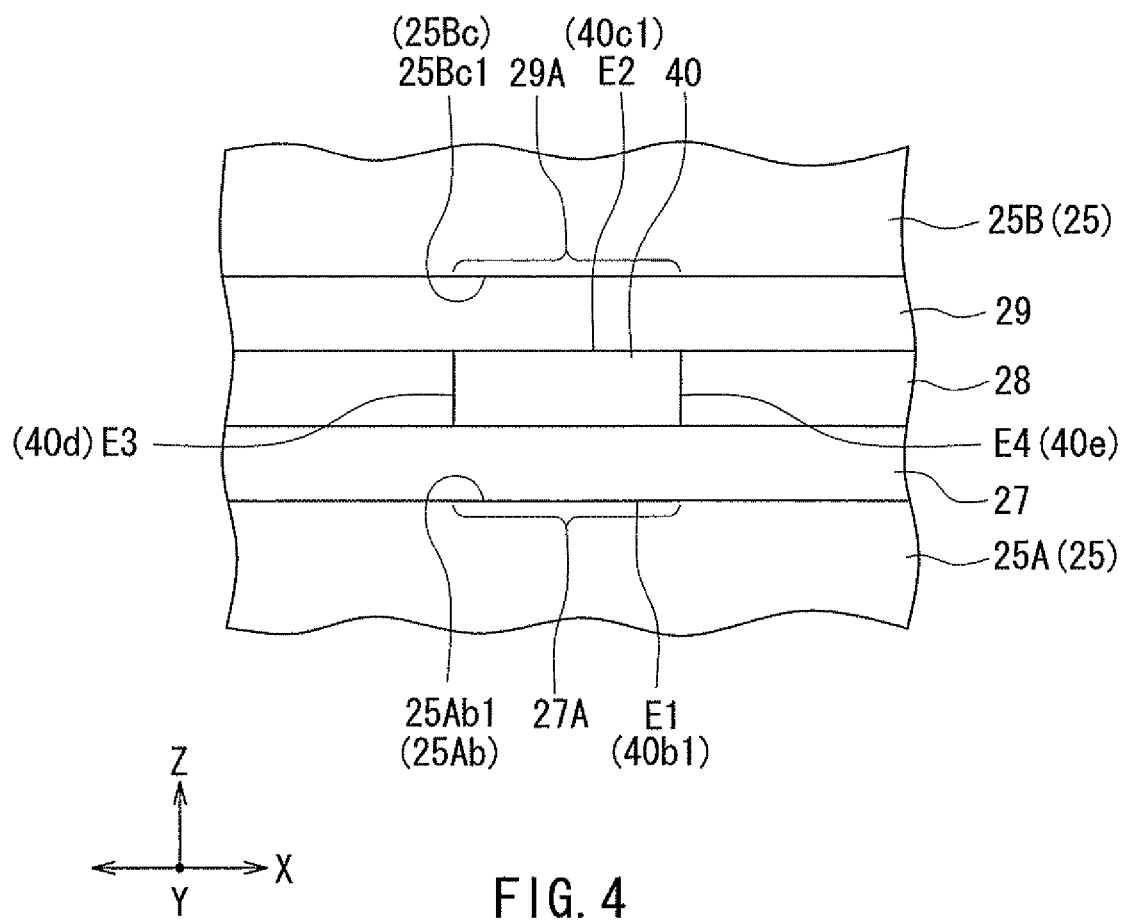
FIG. 4 is a cross-sectional view showing a cross section taken at the position indicated by line 4-4 of FIG. 3.
Figure 5:
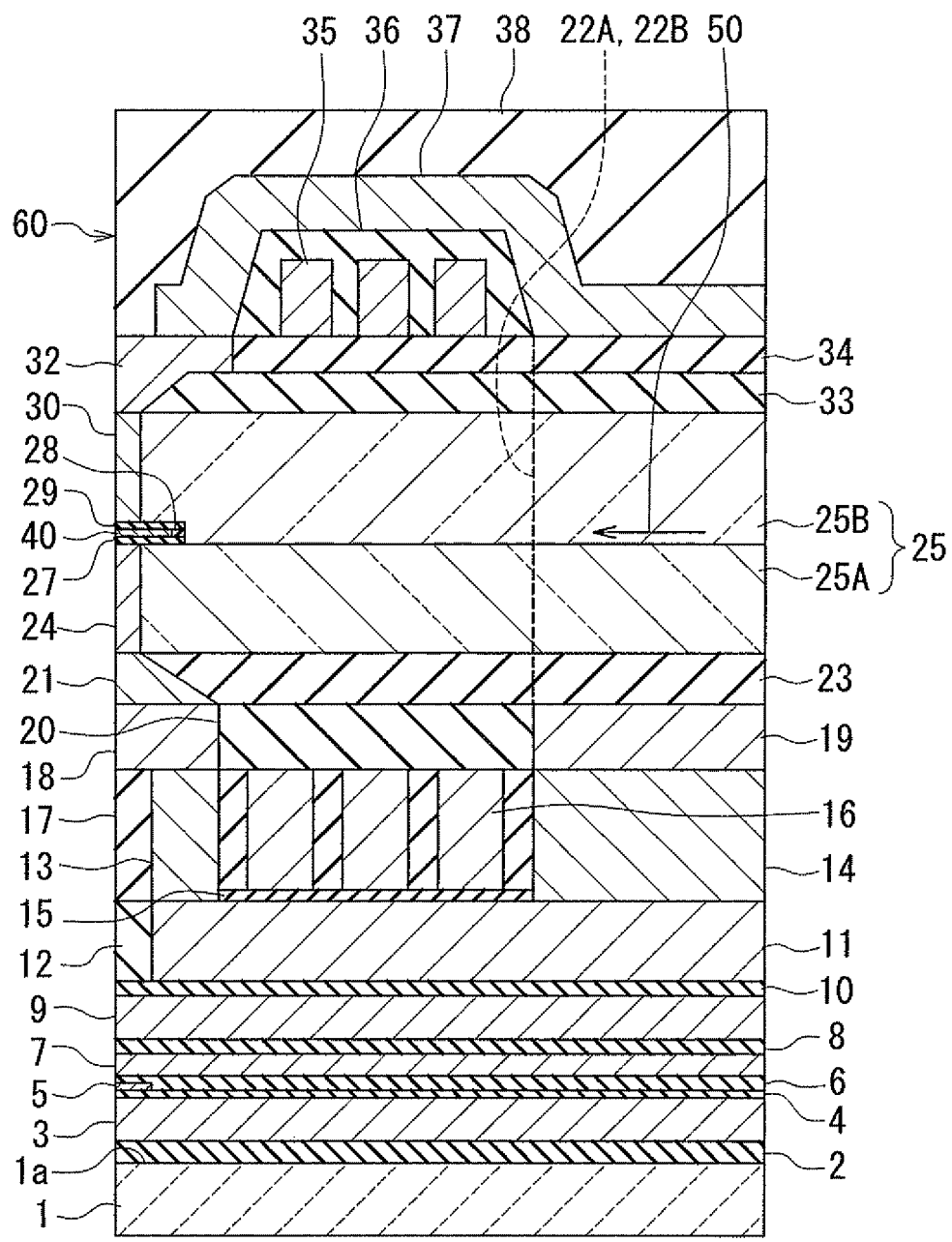
FIG. 5 is a cross-sectional view showing the configuration of the thermally-assisted magnetic recording head according to the first embodiment of the invention.
Figure 6:
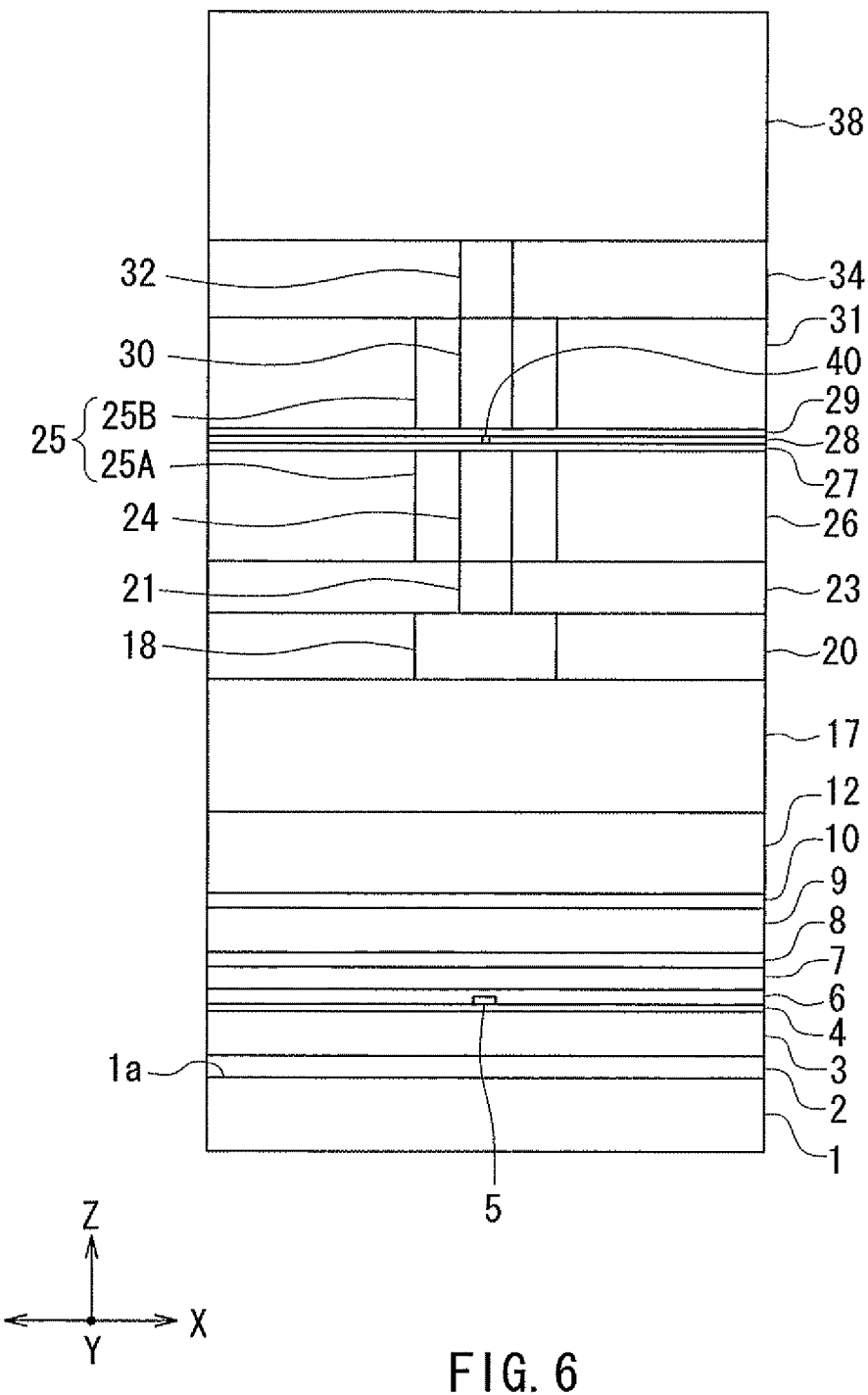
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a perspective view showing the main part of the thermally-assisted magnetic recording head. FIG. 2 is a perspective view showing the shape and location of a plasmon generator. FIG. 3 is a cross-sectional view showing the main part of the thermally-assisted magnetic recording head. FIG. 4 is a cross-sectional view showing a cross section taken at the position indicated by line 4-4 of FIG. 3. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 60 that faces the recording medium. Here, X direction, Y direction, and Z direction will be defined as follows. The X direction is the direction across the tracks of the recording medium, i.e., the track width direction. The Y direction is a direction perpendicular to the medium facing surface 60. The Z direction is the direction of travel of the recording medium as viewed from the slider. The X, Y, and Z directions are orthogonal to one another.

As shown in FIG. 5 and FIG. 6, the thermally-assisted magnetic recording head includes: a substrate 1 made of a ceramic material such as aluminum oxide-titanium carbide ($Al_2O_3.TiC$) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 60 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 made of a magnetic material and disposed on the insulating layer 8, and a nonmagnetic layer 10 made of a nonmagnetic material and disposed on the middle shield layer 9. The insulating layer 8 and the nonmagnetic layer 10 are made of alumina, for example.

The thermally-assisted magnetic recording head further includes a return pole layer 11 made of a magnetic material and disposed on the nonmagnetic layer 10, and an insulating layer 12 disposed on the nonmagnetic layer 10 and surrounding the return pole layer 11. The return pole layer 11 has an end face facing toward the medium facing surface 60 and located at a distance from the medium facing surface 60. The insulating layer 12 is made of alumina, for example.

The thermally-assisted magnetic recording head further includes: a coupling layer 13 located near the medium facing surface 60 and lying on a part of the return pole layer 11; a coupling layer 14 located away from the medium facing surface 60 and lying on another part of the return pole layer 11; an insulating layer 15 lying on the remainder of the return pole layer 11 and on the insulating layer 12; and a coil 16 lying on the insulating layer 15. The coupling layers 13 and 14 are each made of a magnetic material. The coupling layer 13 has an end face facing toward the medium facing surface 60 and located at a distance from the medium facing surface 60. The coil 16 is planar spiral-shaped and wound around the coupling layer 14. The coil 16 is made of a conductive material such as copper. The insulating layer 15 is made of alumina, for example.

The thermally-assisted magnetic recording head further includes: an insulating layer 17 disposed around the coupling layers 13 and 14 and the coil 16 and in the space between adjacent turns of the coil 16; a coupling layer 18 disposed over the coupling layer 13 and the insulating layer 17; a coupling layer 19 disposed on the coupling layer 14; and an insulating layer 20 disposed over the coil 16 and the insulating layer 17 and surrounding the coupling layers 18 and 19. The coupling layers 18 and 19 are each made of a magnetic material. The coupling layer 18 has an end face located in the medium facing surface 60. The insulating layers 17 and 20 are made of alumina, for example.

The thermally-assisted magnetic recording head further includes: a coupling layer 21 and a shield layer 24 stacked in this order on the coupling layer 18; and two coupling portions 22A and 22B disposed on the coupling layer 19. The coupling layer 21, the coupling portions 22A and 22B, and the shield layer 24 are each made of a magnetic material. Each of the coupling layer 21 and the shield layer 24 has a front end face located in the medium facing surface 60 and a rear end face opposite to the front end face. The front end face of each of the coupling layer 21 and the shield layer 24 has a rectangular shape, for example. The distance from the medium facing surface 60 to an arbitrary point on the rear end face of the coupling layer 21 decreases with increasing distance from the arbitrary point to the top surface 1a of the substrate 1. The rear end face of the shield layer 24 is parallel to the medium facing surface 60. Each of the coupling portions 22A and 22B has a first layer located on the coupling layer 19, and a second, a third, and a fourth layer stacked in this order on the first layer. The first layer of the coupling portion 22A and the first layer of the coupling portion 22B are aligned in the track width direction (the X direction).

The thermally-assisted magnetic recording head further includes a main pole 30 disposed above the shield layer 24, and a plasmon generator 40 disposed between the shield layer 24 and the main pole 30. The main pole 30 has a front end face located in the medium facing surface 60 and a rear end face opposite to the front end face. The front end face of the main pole 30 has a rectangular shape, for example. The rear end face of the main pole 30 is parallel to the medium facing surface 60.

The plasmon generator 40 is configured to excite surface plasmons on the principle to be described later. In the present embodiment, the plasmon generator 40 is plate-shaped. The plasmon generator 40 has a thickness (dimension in the Z direction) that is generally constant regardless of the distance from the medium facing surface 60. The plasmon generator 40 is made of, for example, one of Au, Ag, Al, Cu, Pd, Pt, Rh and Ir, or an alloy composed of two or more of these elements.

The thermally-assisted magnetic recording head further includes a waveguide and dielectric layers 27, 28, and 29. The waveguide includes a core 25 through which light propagates, and a cladding provided around the core 25. The core 25 includes a first layer 25A and a second layer 25B. The cladding includes cladding layers 23, 26, 31, and 33. The cladding layer 23 is disposed over the coupling layer 19 and the insulating layer 20 and surrounds the coupling layer 21. The first layer 25A of the core 25 is disposed on the cladding layer 23 such that the shield layer 24 is interposed between the first layer 25A and the medium facing surface 60. The cladding layer 26 is disposed on the cladding layer 23 and surrounds the first layer 25A. The top surfaces of the shield layer 24, the first layer 25A and the cladding layer 26 are even with each other.

The dielectric layer 27 is disposed over the top surface of the shield layer 24 and portions of the top surfaces of the first layer 25A and the cladding layer 26. The plasmon generator 40 is disposed on the dielectric layer 27. As shown in FIG. 4, the dielectric layer 27 includes a first gap part 27A interposed between the first layer 25A and the plasmon generator 40.

The dielectric layer 28 is disposed on the dielectric layer 27 and surrounds the plasmon generator 40. The dielectric layer 29 is disposed over the plasmon generator 40 and the dielectric layer 28. The main pole 30 is disposed on the dielectric layer 29. The second layer 25B of the core 25 is disposed on the first layer 25A and the dielectric layer 29 such that the main pole 30 is interposed between the second layer 25B and the medium facing surface 60. As shown in FIG. 4, the dielectric layer 29 includes a second gap part 29A interposed between the second layer 25B and the plasmon generator 40.

The cladding layer 31 is disposed over the cladding layer 26 and the dielectric layer 29 and surrounds the second layer 25B. The cladding layer 33 is disposed over the second layer 25B and the cladding layer 31.

The first layers of the coupling portions 22A and 22B are embedded in the cladding layer 23. The second layers of the coupling portions 22A and 22B are embedded in the cladding layer 26. The third layers of the coupling portions 22A and 22B are embedded in the cladding layer 31. The second layer of the coupling portion 22A and the second layer of the coupling portion 22B are located on opposite sides of the first layer 25A in the track width direction (the X direction) and are each spaced from the first layer 25A. The third layer of the coupling portion 22A and the third layer of the coupling portion 22B are located on opposite sides of the second layer 25B in the track width direction and are each spaced from the second layer 25B.

The core 25 is made of a dielectric material that transmits laser light to be used for generating near-field light. The laser light emitted from a laser diode (not shown) enters the core 25 and propagates through the core 25. The cladding layers 23, 26, 31 and 33 and the dielectric layers 27 to 29 are each made of a dielectric material that has a refractive index lower than that of the core 25. For example, the core 25 may be made of tantalum oxide such as $Ta_2O_5$ or silicon oxynitride (SiON), whereas the cladding layers 23, 26, 31 and 33 and the dielectric layers 27 to 29 may be made of silicon dioxide ($SiO_2$) or alumina. The shapes of the core 25 and the plasmon generator 40 will be described in detail later.

The thermally-assisted magnetic recording head further includes a coupling layer 32 made of a magnetic material and disposed on the main pole 30 and the cladding layer 33. The coupling layer 32 has a front end face located in the medium facing surface 60, a rear end face opposite to the front end face, a bottom surface, and first and second connecting surfaces connecting the rear end face and the bottom surface to each other. The front end face of the coupling layer 32 has a rectangular shape, for example. In the coupling layer 32, one end of the first connecting surface is connected to the bottom surface, the other end of the first connecting surface is connected to one end of the second connecting surface, and the other end of the second connecting surface is connected to the rear end face. The distance from the medium facing surface 60 to an arbitrary point on the first connecting surface increases with increasing distance from the arbitrary point to the top surface 1a of the substrate 1. The bottom surface and the second connecting surface extend substantially in the direction perpendicular to the medium facing surface 60 (the Y direction). The rear end face is parallel to the medium facing surface 60.

The thermally-assisted magnetic recording head further includes a dielectric layer 34 disposed on the cladding layer 33 and surrounding the coupling layer 32. The fourth layers of the coupling portions 22A and 22B are embedded in the cladding layer 33 and the dielectric layer 34. The top surfaces of the coupling layer 32, the fourth layers of the coupling portions 22A and 22B, and the dielectric layer 34 are even with each other. The dielectric layer 34 is made of the same material as the cladding layers 23, 26, 31 and 33.

The thermally-assisted magnetic recording head further includes a coil 35 disposed on the dielectric layer 34, an insulating layer 36 disposed to cover the coil 35, and a yoke layer 37 made of a magnetic material and disposed over the coupling layer 32, the coupling portions 22A and 22B, the dielectric layer 34 and the insulating layer 36. The yoke layer 37 magnetically couples the coupling layer 32 to the coupling portions 22A and 22B. The coil 35 is planar spiral-shaped and wound around portions of the yoke layer 37 lying on the coupling portions 22A and 22B. The coil 35 is made of a conductive material such as copper. The insulating layer 36 is made of alumina, for example.

The thermally-assisted magnetic recording head further includes a protective layer 38 disposed to cover the yoke layer 37. The protective layer 38 is made of alumina, for example.

The parts from the return pole layer 11 to the yoke layer 37 constitute a write head section. The coils 16 and 35 produce magnetic fields corresponding to data to be written on a recording medium. The shield layer 24, the coupling layers 21, 18 and 13, the return pole layer 11, the coupling layers 14 and 19, the coupling portions 22A and 22B, the yoke layer 37, the coupling layer 32, and the main pole 30 form a magnetic path for passing magnetic fluxes corresponding to the magnetic fields produced by the coils 16 and 35. The coils 16 and 35 are connected in series or in parallel so that the magnetic flux corresponding to the magnetic field produced by the coil 16 and the magnetic flux corresponding to the magnetic field produced by the coil 35 flow in the same direction through the aforementioned magnetic path. The main pole 30 produces a write magnetic field for writing data on a recording medium by means of a perpendicular magnetic recording system based on the magnetic fluxes passing through the aforementioned magnetic path.

As has been described, the thermally-assisted magnetic recording head according to the present embodiment includes the medium facing surface 60, the read head section, and the write head section. The medium facing surface 60 faces a recording medium. The read head section and the write head section are stacked on the substrate 1. The write head section is located on the front side in the direction of travel of the recording medium (the Z direction) (i.e., the trailing side) relative to the read head section.

The write head section includes the coils 16 and 35, the main pole 30, and a near-field light generator according to the present embodiment. The near-field light generator includes the waveguide, the first and second gap parts 27A and 29A, and the plasmon generator 40. The waveguide includes the core 25 and the cladding. The core 25 includes the first layer 25A and the second layer 25B. The cladding includes the cladding layers 23, 26, 31, and 33. The first layer 25A and the second layer 25B are aligned along the direction of travel of the recording medium (the Z direction). The first gap part 27A, the plasmon generator 40, and the second gap part 29A are interposed between the first layer 25A and the second layer 25B. At least part of the main pole 30 is located between the medium facing surface 60 and one of the first layer 25A and the second layer 25B. In the present embodiment, the main pole 30 is located on the front side in the direction of travel of the recording medium (the Z direction) relative to the plasmon generator 40, and lies entirely between the second layer 25B and the medium facing surface 60.

The shapes of the core 25 and the plasmon generator 40 will now be described in detail with reference to FIG. 1 to FIG. 4. As shown in FIG. 1 and FIG. 3, the first layer 25A of the core 25 has an end face 25Aa closer to the medium facing surface 60, a top surface 25Ab, a bottom surface 25Ac, and two side surfaces 25Ad and 25Ae. The end face 25Aa includes a first portion 25Aa1, a second portion 25Aa2, and a third portion 25Aa3. The second portion 25Aa2 and the third portion 25Aa3 are located on opposite sides of the first portion 25Aa1 in the track width direction (the X direction). The first portion 25Aa1 is located away from the medium facing surface 60. The second and third portions 25Aa2 and 25Aa3 are located in the medium facing surface 60. The shield layer 24 is located between the first portion 25Aa1 and the medium facing surface 60. Note that the shield layer 24 may or may not be in contact with the first layer 25A. In the latter case, part of the cladding may be interposed between the shield layer 24 and the first layer 25A.

As shown in FIG. 1 and FIG. 3, the second layer 25B of the core 25 has an end face 25Ba closer to the medium facing surface 60, a top surface 25Bb, a bottom surface 25Bc, and two side surfaces 25Bd and 25Be. The end face 25Ba includes a first portion 25Ba1, a second portion 25Ba2, and a third portion 25Ba3. The second portion 25Ba2 and the third portion 25Ba3 are located on opposite sides of the first portion 25Ba1 in the track width direction (the X direction). The first portion 25Ba1 is located away from the medium facing surface 60. The second and third portions 25Ba2 and 25Ba3 are located in the medium facing surface 60. The main pole 30 is located between the first portion 25Ba1 and the medium facing surface 60. Note that the main pole 30 may or may not be in contact with the second layer 25B. In the latter case, part of the cladding may be interposed between the main pole 30 and the second layer 25B.

The bottom surface 25Bc of the second layer 25B includes a front portion and a rear portion, the front portion being located closer to the medium facing surface 60. The rear portion is located away from the medium facing surface 60 and in contact with the top surface 25Ab of the first layer 25A. The front portion is located farther from the top surface 25Ab than is the rear portion by a distance created by the thicknesses of the dielectric layers 27 and 29 and the plasmon generator 40.

The top surface 25Ab of the first layer 25A includes a first evanescent light generating surface 25Ab1 that generates first evanescent light based on the light propagating through the core 25. The bottom surface 25Bc of the second layer 25B includes a second evanescent light generating surface 25Bc1 that generates second evanescent light based on the light propagating through the core 25. The first and second evanescent light generating surfaces 25Ab1 and 25Bc1 are disposed such that the plasmon generator 40 is interposed therebetween. Since the first layer 25A and the second layer 25B are portions of the core 25, the core 25 can be said to include the first and second evanescent light generating surfaces 25Ab1 and 25Bc1.

As shown in FIG. 2 and FIG. 3, the plasmon generator 40 has an outer surface. The outer surface includes a front end face 40a located in the medium facing surface 60, a bottom surface 40b, a top surface 40c, first and second side surfaces 40d and 40e, and a rear end face 40f. The bottom surface 40b includes a first plasmon exciting part 40b1 that is opposed to the first evanescent light generating surface 25Ab1 with a predetermined spacing therebetween. The top surface 40c includes a second plasmon exciting part 40c1 that is opposed to the second evanescent light generating surface 25Bc1 with a predetermined spacing therebetween.

As shown in FIG. 4, the first gap part 27A is interposed between the first evanescent light generating surface 25Ab1 and the first plasmon exciting part 40b1. The second gap part 29A is interposed between the second evanescent light generating surface 25Bc1 and the second plasmon exciting part 40c1. The first evanescent light generating surface 25Ab1, the first gap part 27A, the first plasmon exciting part 40b1, the second plasmon exciting part 40c1, the second gap part 29A, and the second evanescent light generating surface 25Bc1 are aligned along the direction of travel of the recording medium (the Z direction).

Now, with reference to FIG. 4, a description will be made as to the shape of a cross section of the plasmon generator 40 parallel to the front end face 40a, the cross section having a periphery defined in part by the first and second plasmon exciting parts 40b1 and 40c1 (such a cross section will hereinafter be referred to as exciting-part cross section). The exciting-part cross section is in the shape of a quadrangle defined by a first side E1, a second side E2, a third side E3, and a fourth side E4, to be described below. The first side E1 is defined in its entirety by the first plasmon exciting part 40b1. The second side E2 is defined in its entirety by the second plasmon exciting part 40c1. The third side E3 connects between one end of the first side E1 and one end of the second side E2. The fourth side E4 connects between the other end of the first side E1 and the other end of the second side E2. In the present embodiment, the exciting-part cross section is in the shape of a rectangle, in particular.

As shown in FIG. 2, the plasmon generator 40 includes a narrow portion 41 that is located in the vicinity of the medium facing surface 60 and a wide portion 42 that is located farther from the medium facing surface 60 than is the narrow portion 41. The narrow portion 41 has a front end face located in the medium facing surface 60. The front end face of the narrow portion 41 also serves as the front end face 40a of the plasmon generator 40. In the narrow portion 41, the width of each of the bottom surface 40b and the top surface 40c in the direction parallel to the medium facing surface 60 and to the top surface 1a of the substrate 1 (the X direction) may be constant regardless of the distance from the medium facing surface 60 or may decrease with increasing proximity to the medium facing surface 60. The wide portion 42 is located on a side of the narrow portion 41 farther from the front end face 40a and is coupled to the narrow portion 41. In the wide portion 42, the width of each of the bottom surface 40b and the top surface 40c is the same as that in the narrow portion 41 at the boundary between the narrow portion 41 and the wide portion 42, and increases with increasing distance from the narrow portion 41.

The width (the dimension in the track width direction (the X direction)) of the front end face 40a is defined by the width of the narrow portion 41 in the medium facing surface 60. The width of the front end face 40a falls within the range of 5 to 40 nm, for example. The height (the dimension in the Z direction) of the front end face 40a is defined by the height of the narrow portion 41 in the medium facing surface 60. The height of the front end face 40a falls within the range of 5 to 40 nm, for example.

Now, the principle of generation of near-field light in the present embodiment and the principle of thermally-assisted magnetic recording using the near-field light will be described in detail. Laser light emitted from a laser diode (not shown) enters the core 25. As shown in FIG. 5, the laser light 50 propagates through the core 25 toward the medium facing surface 60, and reaches the vicinity of the plasmon generator 40. The first and second evanescent light generating surfaces 25Ab1 and 25Bc1 of the core 25 each generate evanescent light based on the laser light 50 propagating through the core 25. More specifically, when the laser light 50 is totally reflected at the first evanescent light generating surface 25Ab1, the first evanescent light generating surface 25Ab1 generates first evanescent light permeating into the first gap part 27A. When the laser light 50 is totally reflected at the second evanescent light generating surface 25Bc1, the second evanescent light generating surface 25Bc1 generates second evanescent light permeating into the second gap part 29A. In the plasmon generator 40, a first surface plasmon is excited on the first plasmon exciting part 40b1 through coupling with the first evanescent light, and a second surface plasmon is excited on the second plasmon exciting part 40c1 through coupling with the second evanescent light. The first and second surface plasmons propagate to the front end face 40a, and near-field light is generated from the front end face 40a based on the first and second surface plasmons.

The near-field light generated from the front end face 40a is projected toward a recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 30 for data writing.

The effects of the near-field light generator and the thermally-assisted magnetic recording head according to the present embodiment will now be described. In the present embodiment, as described above, the first and second evanescent light generating surfaces 25Ab1 and 25Bc1 of the core 25 generate the first evanescent light and the second evanescent light, respectively, and the first and second surface plasmons are excited on the first and second plasmon exciting parts 40b1 and 40c1 of the plasmon generator 40 through coupling with the first evanescent light and the second evanescent light, respectively. Thus, in the present embodiment, the first and second evanescent light generating surfaces 25Ab1 and 25Bc1 and the first and second plasmon exciting parts 40b1 and 40c1 are configured so that surface plasmons are excited on both of the first and second plasmon exciting parts 40b1 and 40c1 which are located on opposite sides in the plasmon generator 40. Consequently, according to the present embodiment, when compared with a case where there are provided a single evanescent light generating surface and a single plasmon exciting part, the ratio of a part of the outer surface of the plasmon generator 40, the part being opposed to the outer surface of the core 25, to the entire outer surface of the plasmon generator 40 is increased to allow more surface plasmons to be excited on the plasmon generator 40.

The laser diode typically has an active layer and an emitting end face including an emission part for emitting laser light. The emitting end face is located at an end of the laser diode in a direction parallel to both surfaces of the active layer. The laser diode is positioned with respect to the core 25 in such a manner that, for example, the emission part for emitting the laser light is opposed to the incidence end of the core 25 located on the rear surface of the thermally-assisted magnetic recording head opposite to the medium facing surface 60, and both surfaces of the active layer are parallel to the first and second evanescent light generating surfaces 25Ab1 and 25Bc1. Here, the laser light emitted from the laser diode is preferably TM-mode polarized light whose electric field oscillates in a direction perpendicular to both surfaces of the active layer. In this case, the laser light having propagated through the core 25 has an electric field oscillating in a direction perpendicular to the first and second evanescent light generating surfaces 25Ab1 and 25Bc1. This allows the first and second plasmon exciting parts 40b1 and 40c1 to excite intense first and second surface plasmons, respectively.

Tantalum oxide, which can be used as the material of the core 25, has high heat resistance. In the present embodiment, the plasmon generator 40 is interposed between the first layer 25A and the second layer 25B of the core 25. Thus, according to the present embodiment, forming the core 25 of tantalum oxide makes it possible to prevent the plasmon generator 40 and a portion in the vicinity thereof from being made fragile due to heat generated by the plasmon generator 40.

A method of manufacturing the thermally-assisted magnetic recording head according to the present embodiment will now be described. The method of manufacturing the thermally-assisted magnetic recording head according to the present embodiment includes the steps of forming components of a plurality of thermally-assisted magnetic recording heads, except the substrates 1, on a substrate that includes portions to become the substrates 1 of the plurality of thermally-assisted magnetic recording heads, thereby fabricating a substructure including a plurality pre-head portions aligned in a plurality of rows, the plurality of pre-head portions being intended to become individual thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 60.

Now, the method of manufacturing the thermally-assisted magnetic recording head according to the present embodiment will be described in more detail with attention focused on a single thermally-assisted magnetic recording head. Since the thermally-assisted magnetic recording head according to the present embodiment includes the near-field light generator according to the present embodiment, the following description includes the description of the method of manufacturing the near-field light generator according to the present embodiment. The method of manufacturing the near-field light generator according to the present embodiment includes the steps of forming the waveguide, forming the dielectric layers 27 to 29, and forming the plasmon generator 40. The step of forming the waveguide includes the step of forming the core 25 and the step of forming the cladding layers 23, 26, 31 and 33.

In the method of manufacturing the thermally-assisted magnetic recording head according to the present embodiment, the parts from the insulating layer 2 to the coupling layer 21 and the first layers of the coupling portions 22A and 22B are first formed on the top surface 1a of the substrate 1 in due order of succession. Next, the cladding layer 23 is formed to cover the coupling layer 21 and the first layers of the coupling portions 22A and 22B. The cladding layer 23 is then polished by, for example, chemical mechanical polishing (hereinafter referred to as CMP), until the coupling layer 21 and the first layers of the coupling portions 22A and 22B are exposed.

Then, the shield layer 24 is formed on the coupling layer 21, the first layer 25A of the core 25 is formed on the cladding layer 23, and the second layers of the coupling portions 22A and 22B are formed on the first layers thereof. Next, the cladding layer 26 is formed to cover the shield layer 24, the first layer 25A, and the second layers of the coupling portions 22A and 22B. The cladding layer 26 is then polished by, for example, CMP, until the shield layer 24, the first layer 25A, and the second layers of the coupling portions 22A and 22B are exposed.

Next, the dielectric layer 27 is formed on the top surface of the stack. The plasmon generator 40 and the dielectric layer 28 are then formed on the dielectric layer 27. The plasmon generator 40 is formed by, for example, first forming a metal film to become the plasmon generator 40 on the dielectric layer 27 and then patterning the metal film by etching a part thereof. The dielectric layer 29 is then formed on the plasmon generator 40 and the dielectric layer 28.

Next, the main pole 30 is formed on the dielectric layer 29, the second layer 25B is formed on the dielectric layer 29 and the first layer 25A, and the third layers of the coupling portions 22A and 22B are formed on the second layers thereof. Next, the cladding layer 31 is formed to cover the main pole 30, the second layer 25B, and the third layers of the coupling portions 22A and 22B. The cladding layer 31 is then polished by, for example, CMP, until the main pole 30, the second layer 25B, and the third layers of the coupling portions 22A and 22B are exposed.

Next, a dielectric layer that is to later become the cladding layer 33 is formed over the entire top surface of the stack. The dielectric layer is then selectively etched to form therein an opening for exposing part of the top surface of the stack in the vicinity of the position where the medium facing surface 60 is to be formed, and two openings for exposing the third layers of the coupling portions 22A and 22B. This makes the dielectric layer into the cladding layer 33.

Next, the parts from the coupling layer 22, the fourth layers of the coupling portions 22A and 22B and the dielectric layer 34 to the protective layer 38 are formed in due order of succession. Wiring, terminals, and other components are then formed on the top surface of the protective layer 38. When the substructure is completed thus, the substructure is cut to separate the plurality of pre-head portions from each other, followed by the polishing of the medium facing surface 60 and the fabrication of flying rails etc. This completes the thermally-assisted magnetic recording head.

Modification Examples

Figure 7:
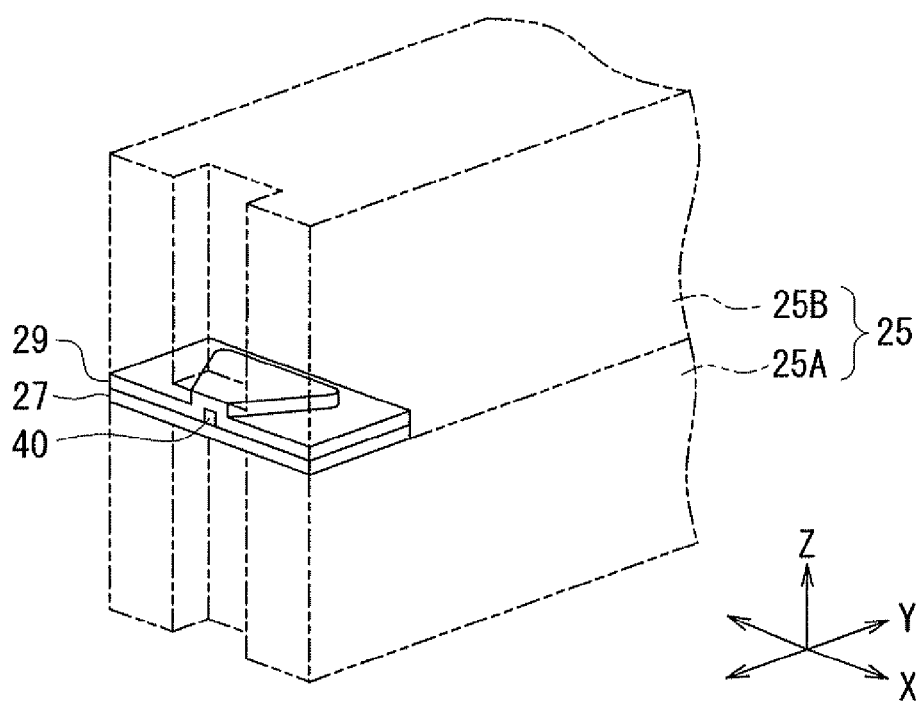
FIG. 7 is a perspective view showing a part in the neighborhood of the plasmon generator in a first modification example of the thermally-assisted magnetic recording head according to the first embodiment of the invention.

First to sixth modification examples of the thermally-assisted magnetic recording head according to the present embodiment will now be described. A first modification example of the thermally-assisted magnetic recording head according to the present embodiment will be described first, with reference to FIG. 7. FIG. 7 is a perspective view showing a part in the neighborhood of the plasmon generator 40 in the first modification example. The first modification example does not have the dielectric layer 28. The dielectric layer 29 covers the top surface of the dielectric layer 27 and the top surface 40c, the side surfaces 40d and 40e and the rear end face 40f of the plasmon generator 40.

Figure 8:
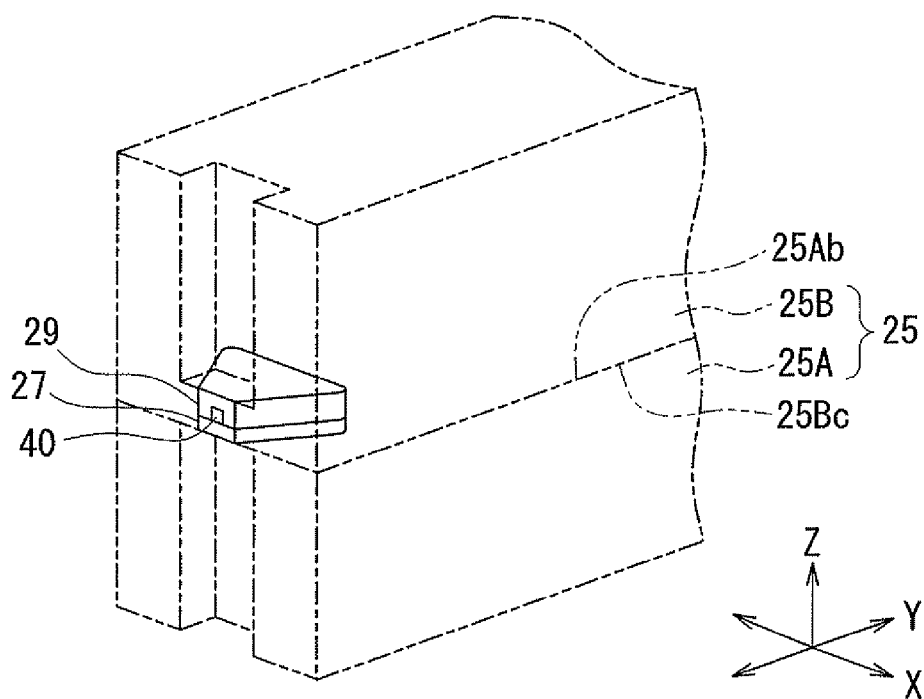
FIG. 8 is a perspective view showing a part in the neighborhood of the plasmon generator in a second modification example of the thermally-assisted magnetic recording head according to the first embodiment of the invention.

A second modification example of the thermally-assisted magnetic recording head according to the present embodiment will now be described with reference to FIG. 8. FIG. 8 is a perspective view showing a part in the neighborhood of the plasmon generator 40 in the second modification example. In the second modification example, as in the first modification example, the dielectric layer 28 is not provided and the dielectric layer 29 covers the dielectric layer 27 and the plasmon generator 40. The planar shape (the shape as viewed from above) of the dielectric layers 27 and 29 is larger than the planar shape of the plasmon generator 40 and the periphery thereof is shaped along the periphery of the planar shape of the plasmon generator 40. The front portion of the bottom surface 25Bc of the second layer 25B of the core 25 is in contact with the top surface 25Ab of the first layer 25A in the regions on opposite sides of the plasmon generator 40 in the track width direction (the X direction).

Figure 9:
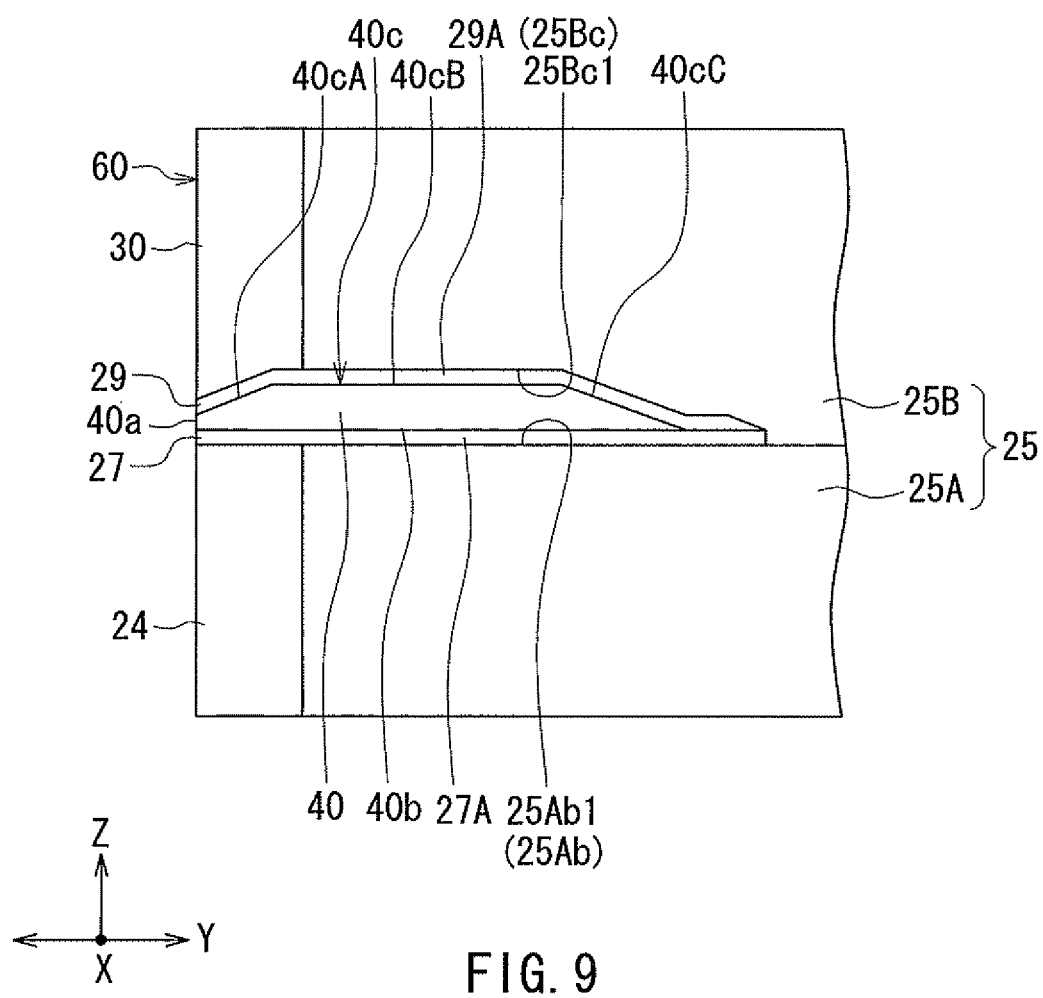
FIG. 9 is a cross-sectional view showing the main part of a third modification example of the thermally-assisted magnetic recording head according to the first embodiment of the invention.

A third modification example of the thermally-assisted magnetic recording head according to the present embodiment will now be described with reference to FIG. 9. FIG. 9 is a cross-sectional view showing the main part of the third modification example of the thermally-assisted magnetic recording head. In the third modification example, the top surface 40c of the plasmon generator 40 includes a first inclined portion 40cA, a horizontal portion 40cB, and a second inclined portion 40cC arranged in this order, the first inclined portion 40cA being closest to the medium facing surface 60. Each of the first and second inclined portions 40cA and 40cC has a front end closer to the medium facing surface 60 and a rear end opposite to the front end. The first inclined portion 40cA is inclined such that its rear end is located on the front side in the direction of travel of the recording medium (the Z direction) relative to its front end. The second inclined portion 40cC is inclined such that its rear end is located on the rear side in the direction of travel of the recording medium (the Z direction) relative to its front end. The horizontal portion 40cB extends substantially in the direction perpendicular to the medium facing surface 60 (the Y direction).

As the plasmon generator 40 is reduced in thickness (dimension in the Z direction), the excitation efficiency of surface plasmons is decreased to cause less surface plasmons to be excited. For this reason, the plasmon generator 40 preferably has a thickness of a certain magnitude. In the third modification example, part of the plasmon generator 40 gradually increases in thickness (dimension in the Z direction) with increasing distance from the medium facing surface 60. According to the third modification example, this allows the front end face 40a to be small in dimension in the Z direction while allowing the plasmon generator 40 to be large in thickness in the part thereof away from the medium facing surface 60. The third modification example thus makes it possible to produce near-field light having a small spot diameter and sufficient intensity.

Figure 10:
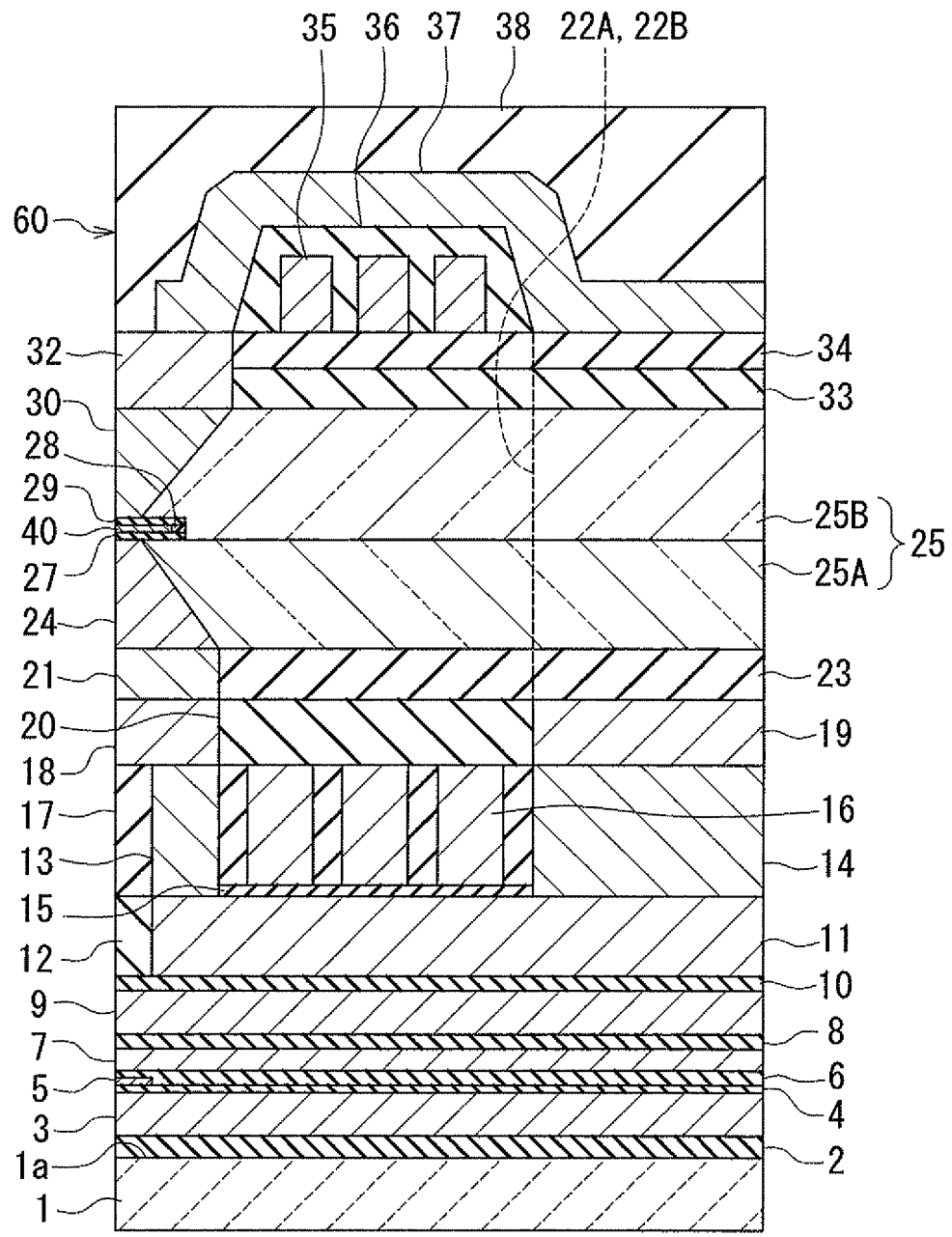
FIG. 10 is a cross-sectional view showing the configuration of a fourth modification example of the thermally-assisted magnetic recording head according to the first embodiment of the invention.

A fourth modification example of the thermally-assisted magnetic recording head according to the present embodiment will now be described with reference to FIG. 10. FIG. 10 is a cross-sectional view showing the configuration of the fourth modification example of the thermally-assisted magnetic recording head. In the fourth modification example, the distance from the medium facing surface 60 to an arbitrary point on the rear end face of the main pole 30 increases with increasing distance from the arbitrary point to the top surface 1a of the substrate 1. Further, the distance from the medium facing surface 60 to an arbitrary point on the rear end face of the shield layer 24 decreases with increasing distance from the arbitrary point to the top surface 1a of the substrate 1. The rear end face of the coupling layer 21 is parallel to the medium facing surface 60. In the fourth modification example, the coupling layer 32 does not have the first and second connecting surfaces.

Figure 11:
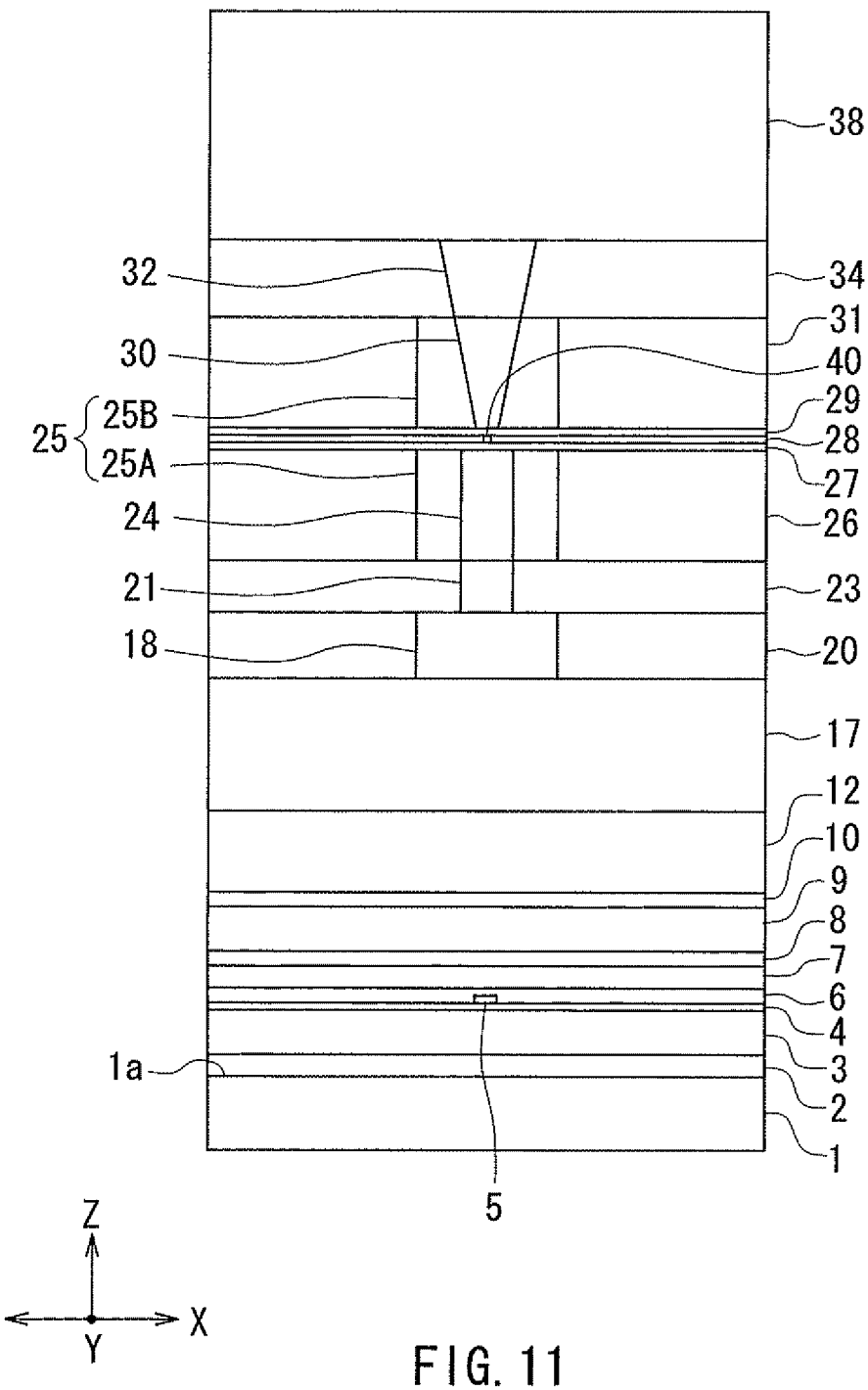
FIG. 11 is a front view showing the medium facing surface of a fifth modification example of the thermally-assisted magnetic recording head according to the first embodiment of the invention.

A fifth modification example of the thermally-assisted magnetic recording head according to the present embodiment will now be described with reference to FIG. 11. FIG. 11 is a front view showing the medium facing surface of the fifth modification example of the thermally-assisted magnetic recording head. In the fifth modification example, the front end faces of the main pole 30 and the coupling layer 32 are trapezoidal in shape, and the widths of the front end faces of the main pole 30 and the coupling layer 32 in the track width direction (the X direction) decrease with increasing proximity to the top surface 1a of the substrate 1, i.e., with increasing proximity to the plasmon generator 40.

Figure 12:
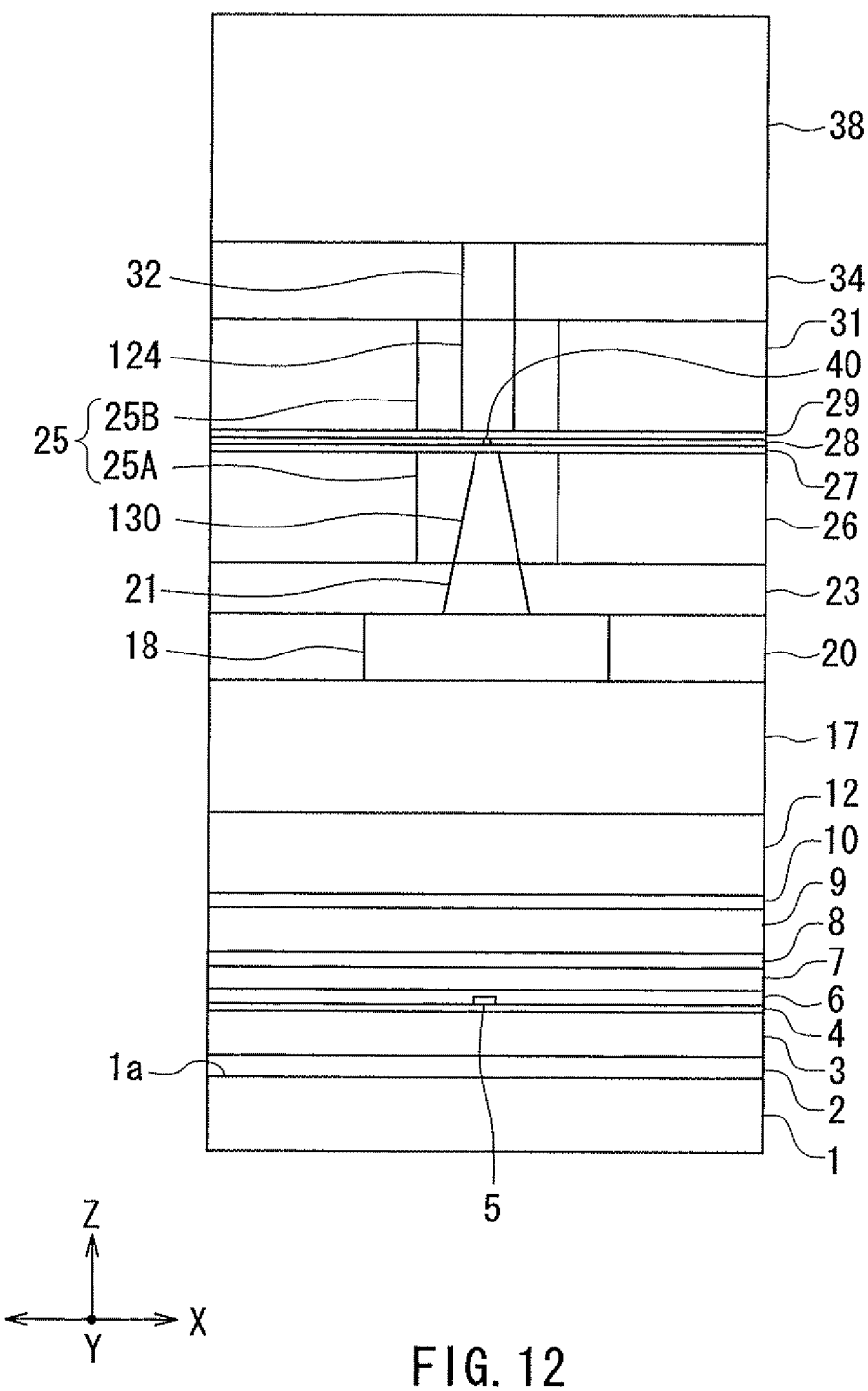
FIG. 12 is a front view showing the medium facing surface of a sixth modification example of the thermally-assisted magnetic recording head according to the first embodiment of the invention.

A sixth modification example of the thermally-assisted magnetic recording head according to the present embodiment will now be described with reference to FIG. 12. FIG. 12 is a front view showing the medium facing surface of the sixth modification example of the thermally-assisted magnetic recording head. In the sixth modification example, the thermally-assisted magnetic recording head has a main pole 130 in place of the shield layer 24, and a shield layer 124 made of a magnetic material in place of the main pole 30.

The main pole 130 is disposed on the coupling layer 21 and lies entirely between the first layer 25A of the core 25 and the medium facing surface 60. The main pole 130 has a front end face located in the medium facing surface 60 and a rear end face opposite to the front end face. In the sixth modification example, the front end faces of the main pole 130 and the coupling layer 21 are trapezoidal in shape, and the widths of the front end faces of the main pole 130 and the coupling layer 21 in the track width direction (the X direction) decrease with increasing distance from the top surface 1a of the substrate 1, i.e., with increasing proximity to the plasmon generator 40. Although not illustrated, the rear end face of the main pole 130 is parallel to the medium facing surface 60.

The shape and location of the shield layer 124 are the same as those of the main pole 30. Specifically, the shield layer 124 is disposed on the dielectric layer 29 and lies entirely between the second layer 25B of the core 25 and the medium facing surface 60. The shield layer 124 has a front end face located in the medium facing surface 60 and a rear end face opposite to the front end face. The front end face of the shield layer 124 has a rectangular shape, for example. Although not illustrated, the rear end face of the shield layer 124 is parallel to the medium facing surface 60.

Second Embodiment

Figure 13:
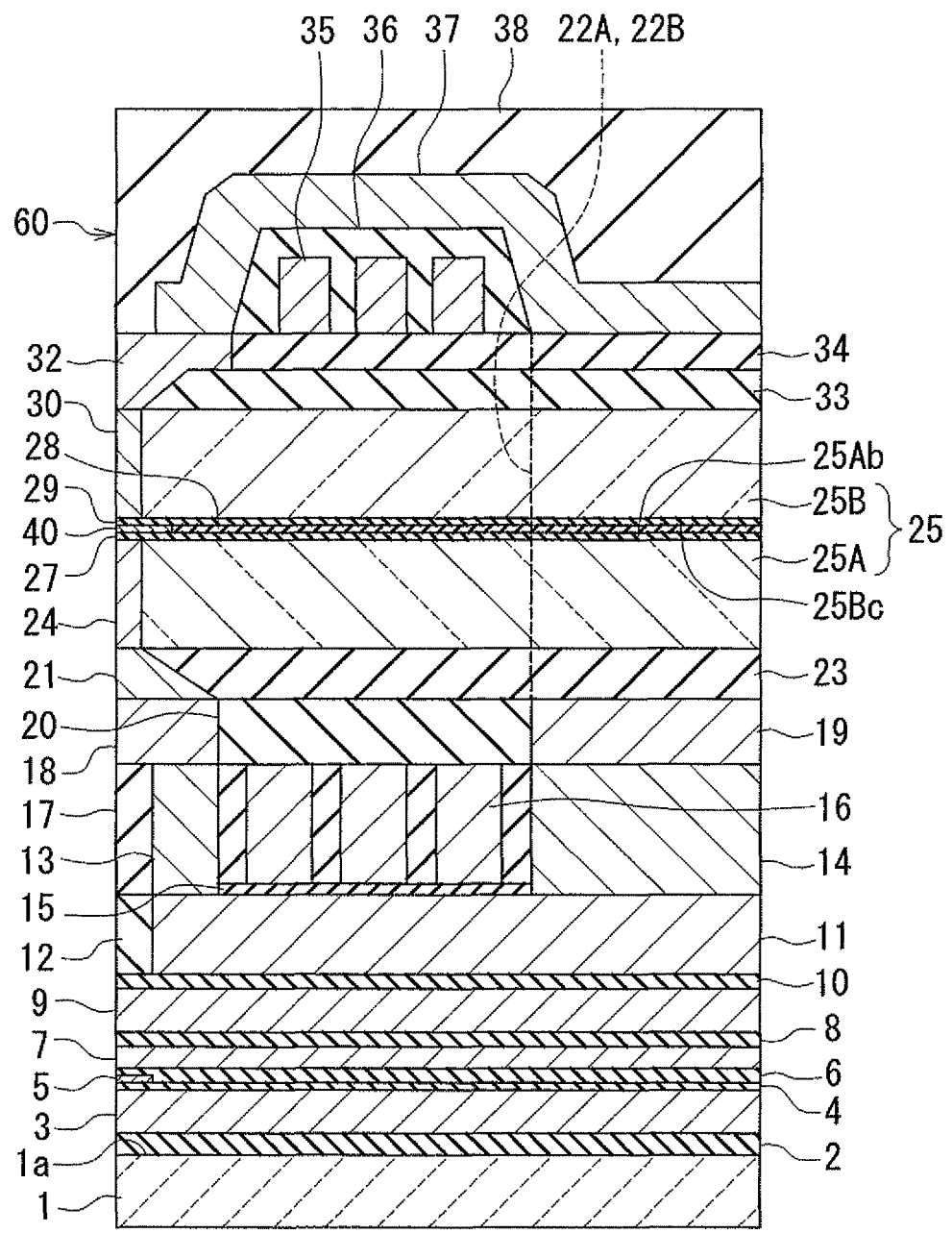
FIG. 13 is a cross-sectional view showing the configuration of a thermally-assisted magnetic recording head according to a second embodiment of the invention.

A thermally-assisted magnetic recording head according to a second embodiment of the invention will now be described with reference to FIG. 13. FIG. 13 is a cross-sectional view showing the configuration of the thermally-assisted magnetic recording head. The configuration of the thermally-assisted magnetic recording head according to the present embodiment differs from that of the head according to the first embodiment as follows. In the thermally-assisted magnetic recording head according to the present embodiment, the dielectric layer 27 is disposed to cover the entirety of the top surface 25Ab of the first layer 25A of the core 25. Thus, the bottom surface 25Bc of the second layer 25B of the core 25 is not in contact with the top surface 25Ab of the first layer 25A, and the entirety of the bottom surface 25Bc of the second layer 25B is located on the front side in the direction of travel of the recording medium (the Z direction) relative to the top surface 25Ab of the first layer 25A by a distance created by the thicknesses of the dielectric layers 27 and 29 and the plasmon generator 40 or the dielectric layer 28.

The remainder of configuration, function and effects of the present embodiment are similar to those of the first embodiment.

Third Embodiment

Figure 14:
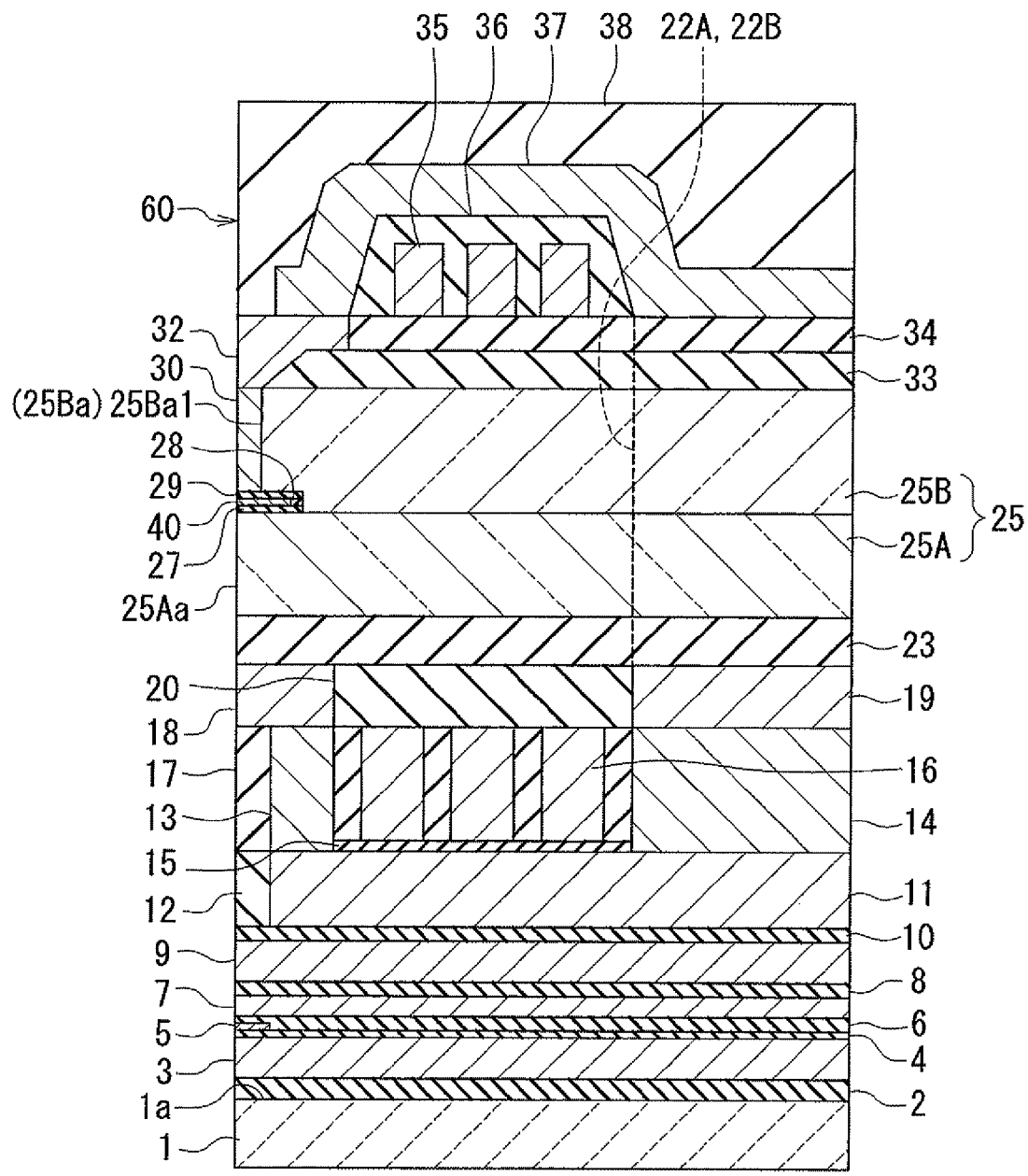
FIG. 14 is a cross-sectional view showing the configuration of a thermally-assisted magnetic recording head according to a third embodiment of the invention.
Figure 15:
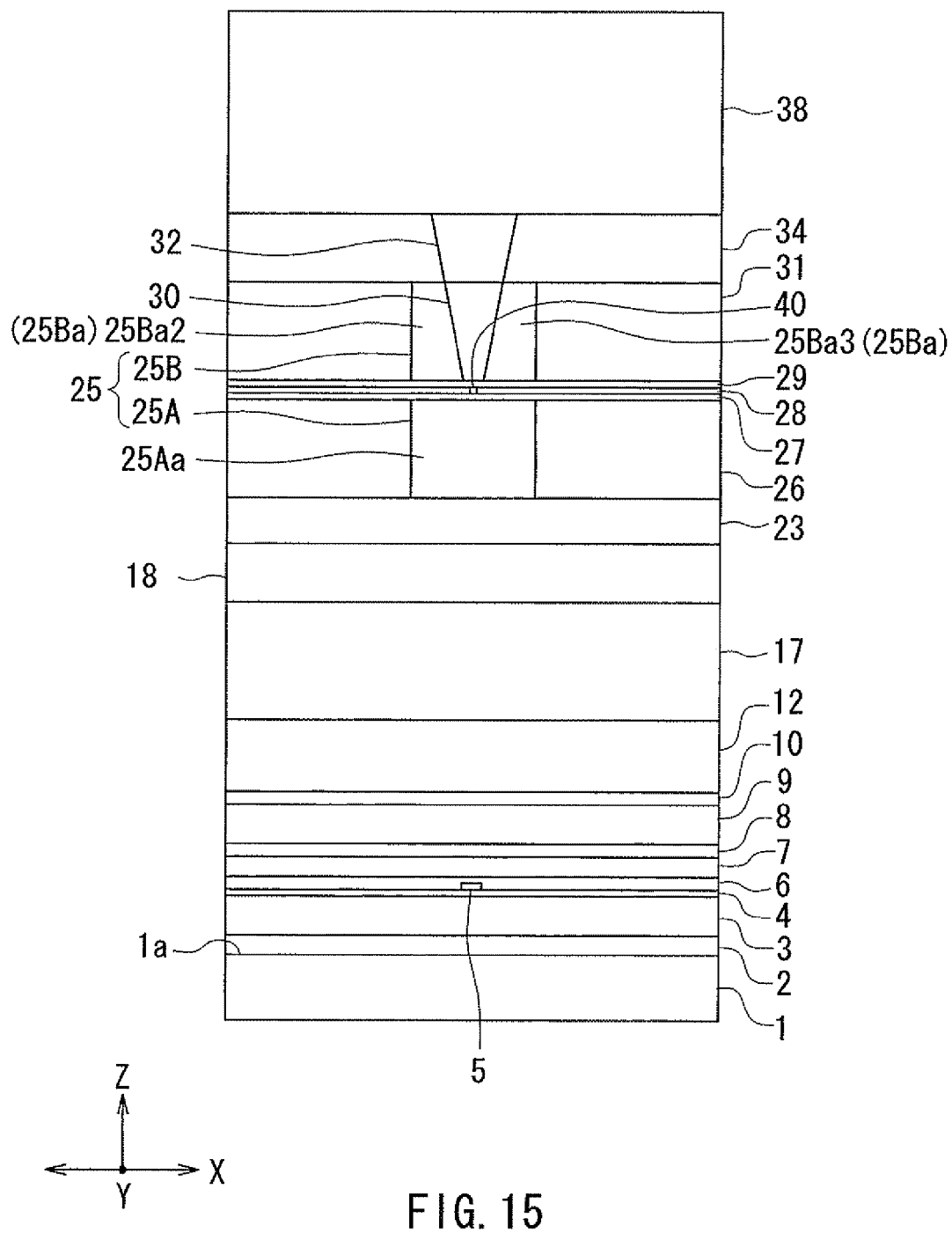
FIG. 15 is a front view showing the medium facing surface of the thermally-assisted magnetic recording head according to the third embodiment of the invention.

A thermally-assisted magnetic recording head according to a third embodiment of the invention will now be described with reference to FIG. 14 and FIG. 15. FIG. 14 is a cross-sectional view showing the configuration of the thermally-assisted magnetic recording head. FIG. 15 is a front view showing the medium facing surface of the thermally-assisted magnetic recording head. The configuration of the thermally-assisted magnetic recording head according to the present embodiment differs from that of the head according to the first embodiment as follows. In the thermally-assisted magnetic recording head according to the present embodiment, the main pole 30 and the coupling layer 32 are of the same shape as those in the fifth modification example of the first embodiment. More specifically, the front end faces of the main pole 30 and the coupling layer 32 are trapezoidal in shape, and the widths of the front end faces of the main pole 30 and the coupling layer 32 in the track width direction (the X direction) decrease with increasing proximity to the top surface 1a of the substrate 1, i.e., with increasing proximity to the plasmon generator 40. Further, in the present embodiment, the shield layer 24 and the coupling layer 21 are not provided and the entirety of the end face 25Aa of the first layer 25A of the core 25 is located in the medium facing surface 60. In the present embodiment, the end face of the coupling layer 18 located in the medium facing surface 60 is greater in width in the X direction as compared with the example shown in FIG. 6 of the first embodiment.

The configurations of the core 25 and the dielectric layers 27 to 29 of the present embodiment may be the same as those of the second embodiment. The remainder of configuration, function and effects of the present embodiment are similar to those of the first or second embodiment.

Fourth Embodiment

Figure 16:
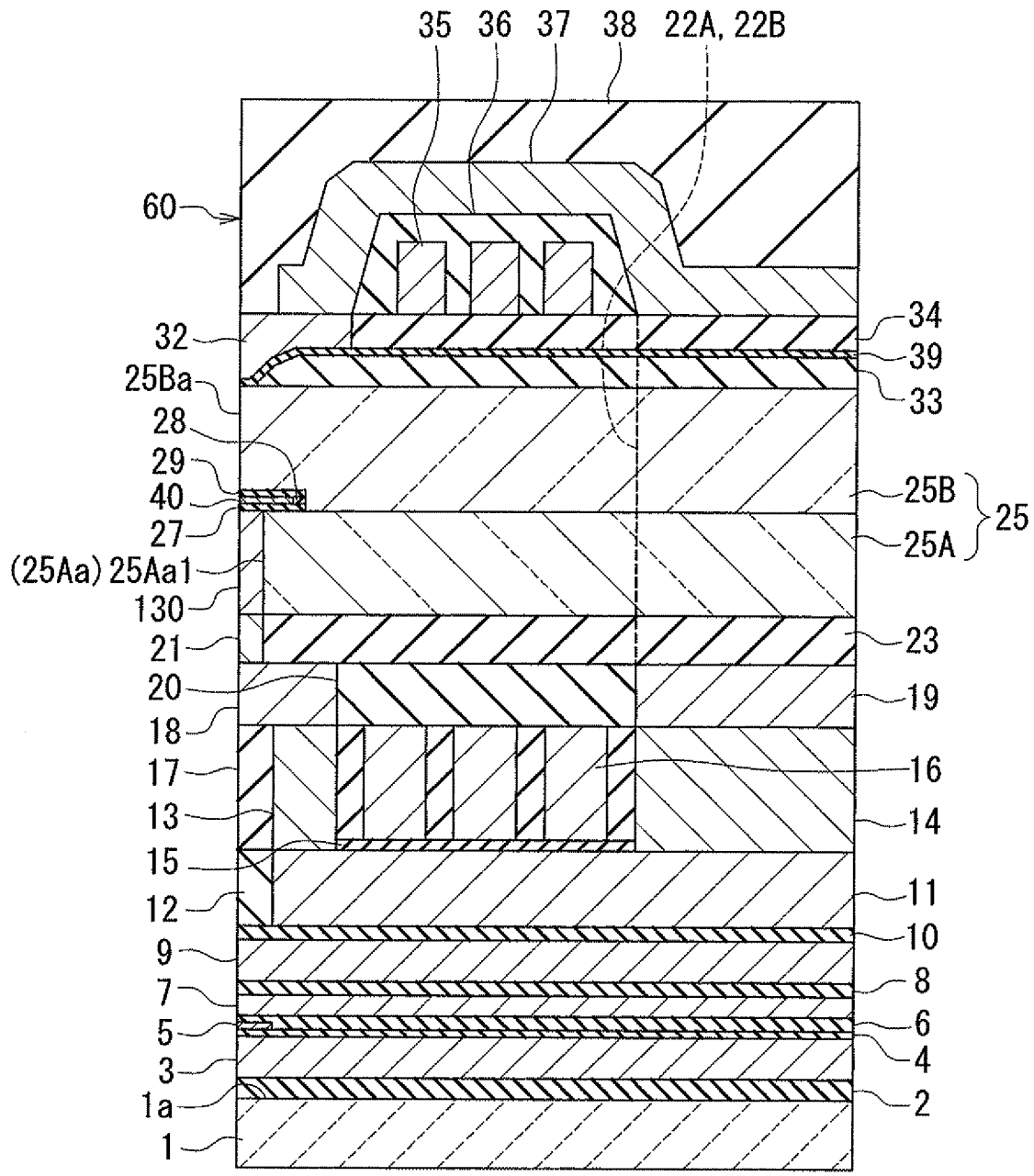
FIG. 16 is a cross-sectional view showing the configuration of a thermally-assisted magnetic recording head according to a fourth embodiment of the invention.
Figure 17:
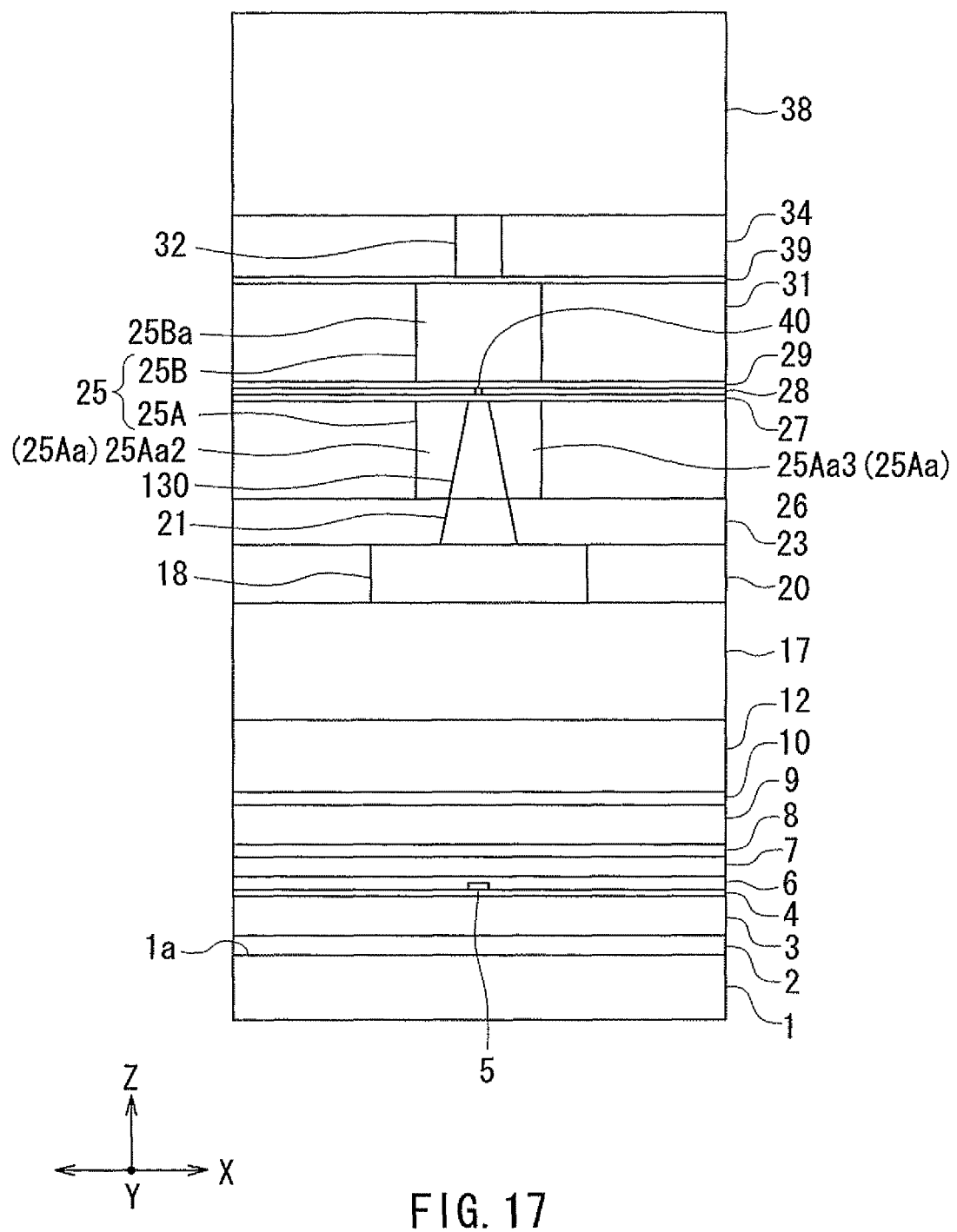
FIG. 17 is a front view showing the medium facing surface of the thermally-assisted magnetic recording head according to the fourth embodiment of the invention.

A thermally-assisted magnetic recording head according to a fourth embodiment of the invention will now be described with reference to FIG. 16 and FIG. 17. FIG. 16 is a cross-sectional view showing the configuration of the thermally-assisted magnetic recording head. FIG. 17 is a front view showing the medium facing surface of the thermally-assisted magnetic recording head. The configuration of the thermally-assisted magnetic recording head according to the present embodiment differs from that of the head according to the first embodiment as follows. The thermally-assisted magnetic recording head according to the present embodiment has the main pole 130 and the coupling layer 21 mentioned in the description of the sixth modification example of the first embodiment, in place of the shield layer 24 and the coupling layer 21 of the first embodiment. In the present embodiment, there is not the shield layer 124 mentioned in the description of the sixth modification example of the first embodiment, and the entirety of the end face 25Ba of the second layer 25B of the core 25 is located in the medium facing surface 60.

The thermally-assisted magnetic recording head according to the present embodiment has a dielectric layer 39 that separates the second layer 25B of the core 25 and the cladding layers 31 and 33 from the coupling layer 32 and the dielectric layer 34. The dielectric layer 39 is made of the same material as the cladding layers 23, 26, 31 and 33, for example.

The configurations of the core 25 and the dielectric layers 27 to 29 of the present embodiment may be the same as those of the second embodiment. The remainder of configuration, function and effects of the present embodiment are similar to those of the first or second embodiment.

Fifth Embodiment

Figure 18:
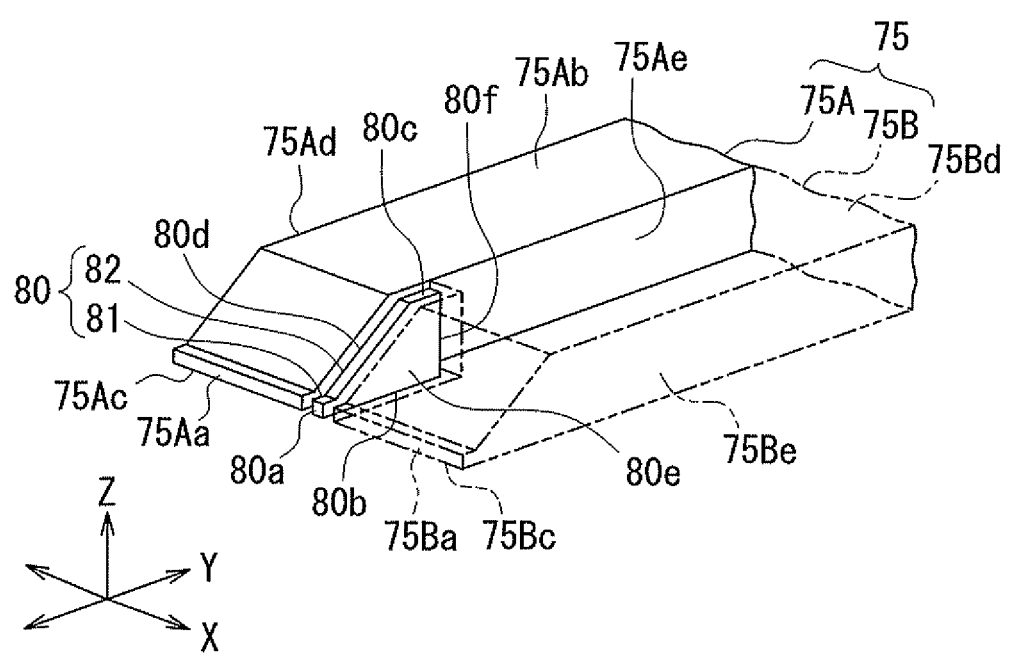
FIG. 18 is a perspective view showing the main part of a thermally-assisted magnetic recording head according to a fifth embodiment of the invention.
Figure 19:
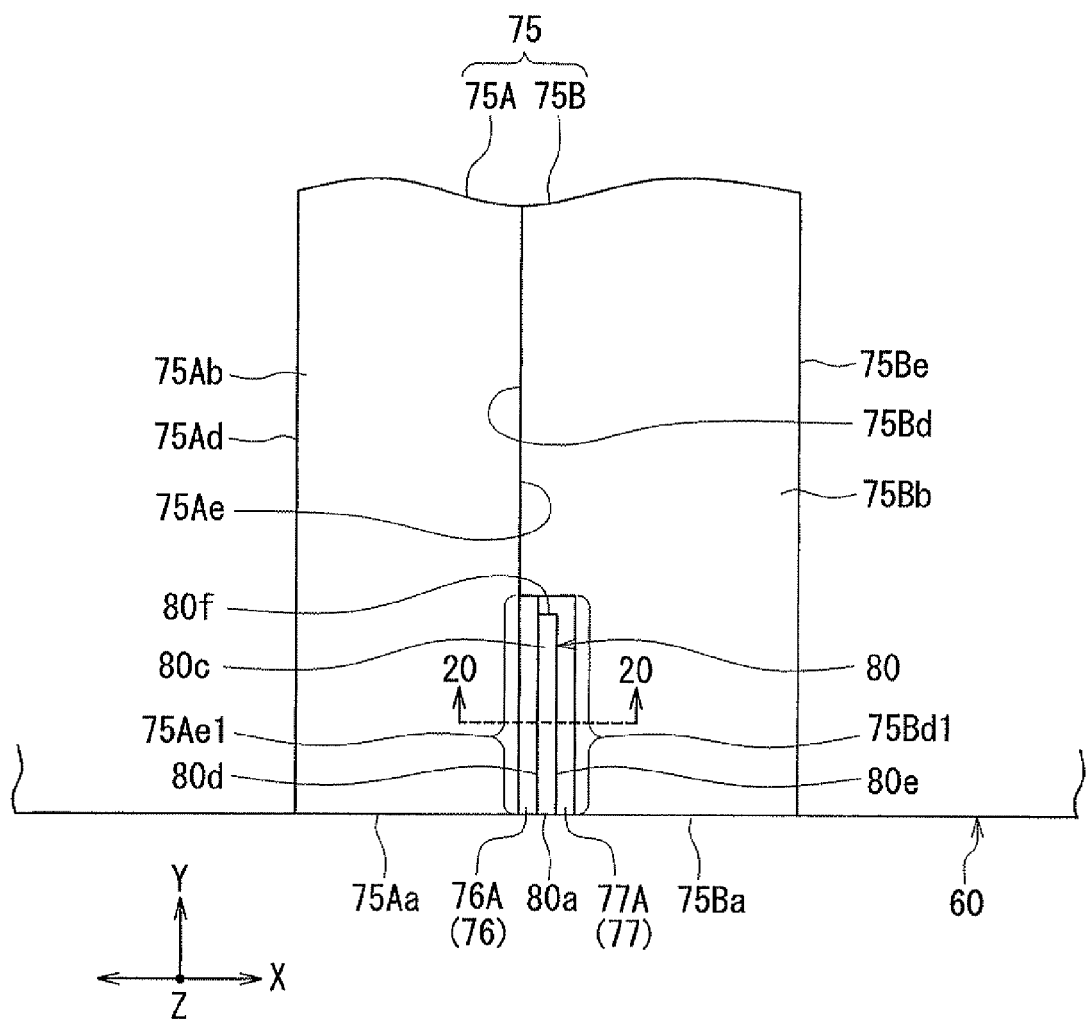
FIG. 19 is a plan view showing the main part of the thermally-assisted magnetic recording head according to the fifth embodiment of the invention.
Figure 20:
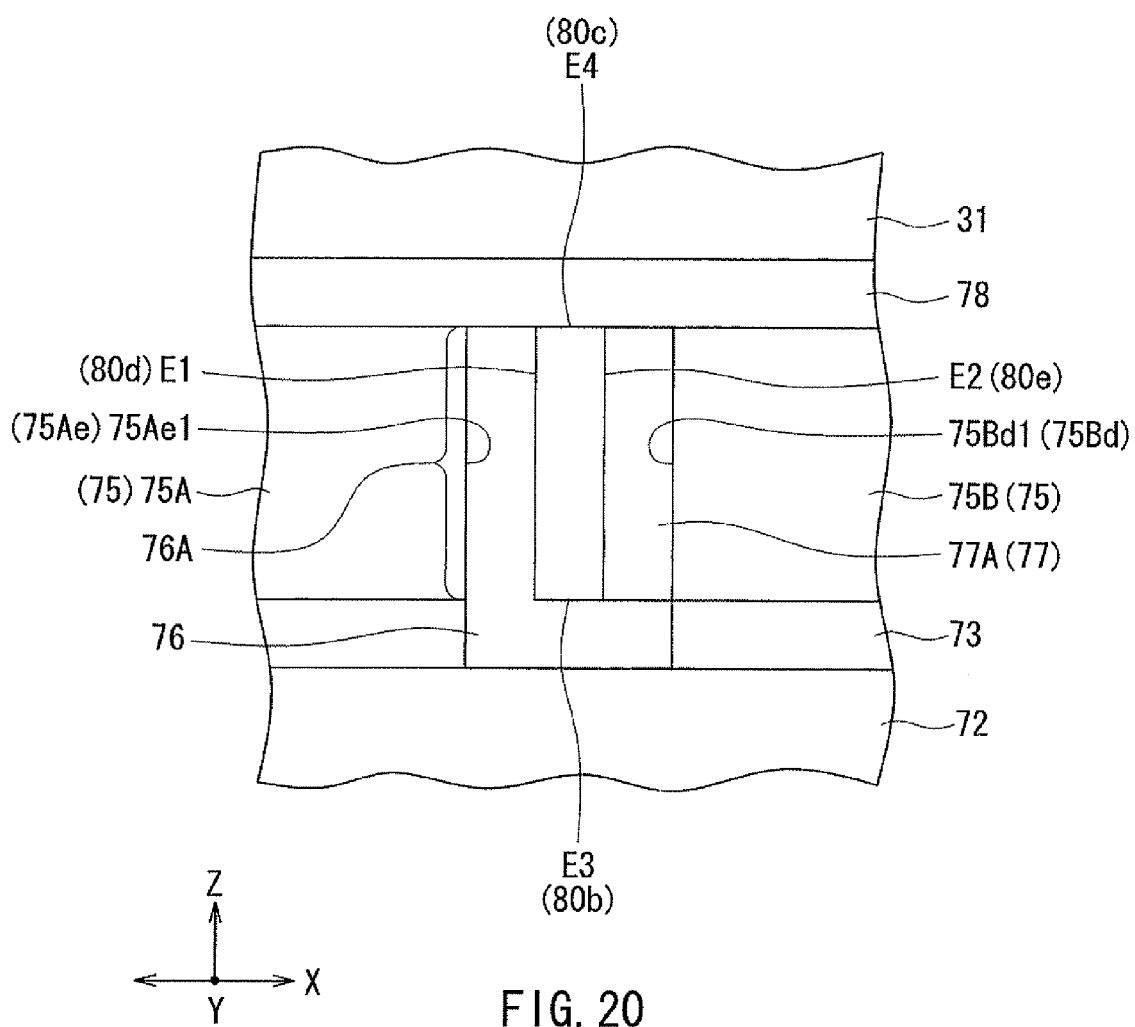
FIG. 20 is a cross-sectional view showing a cross section taken at the position indicated by line 20-20 of FIG. 19.
Figure 21:
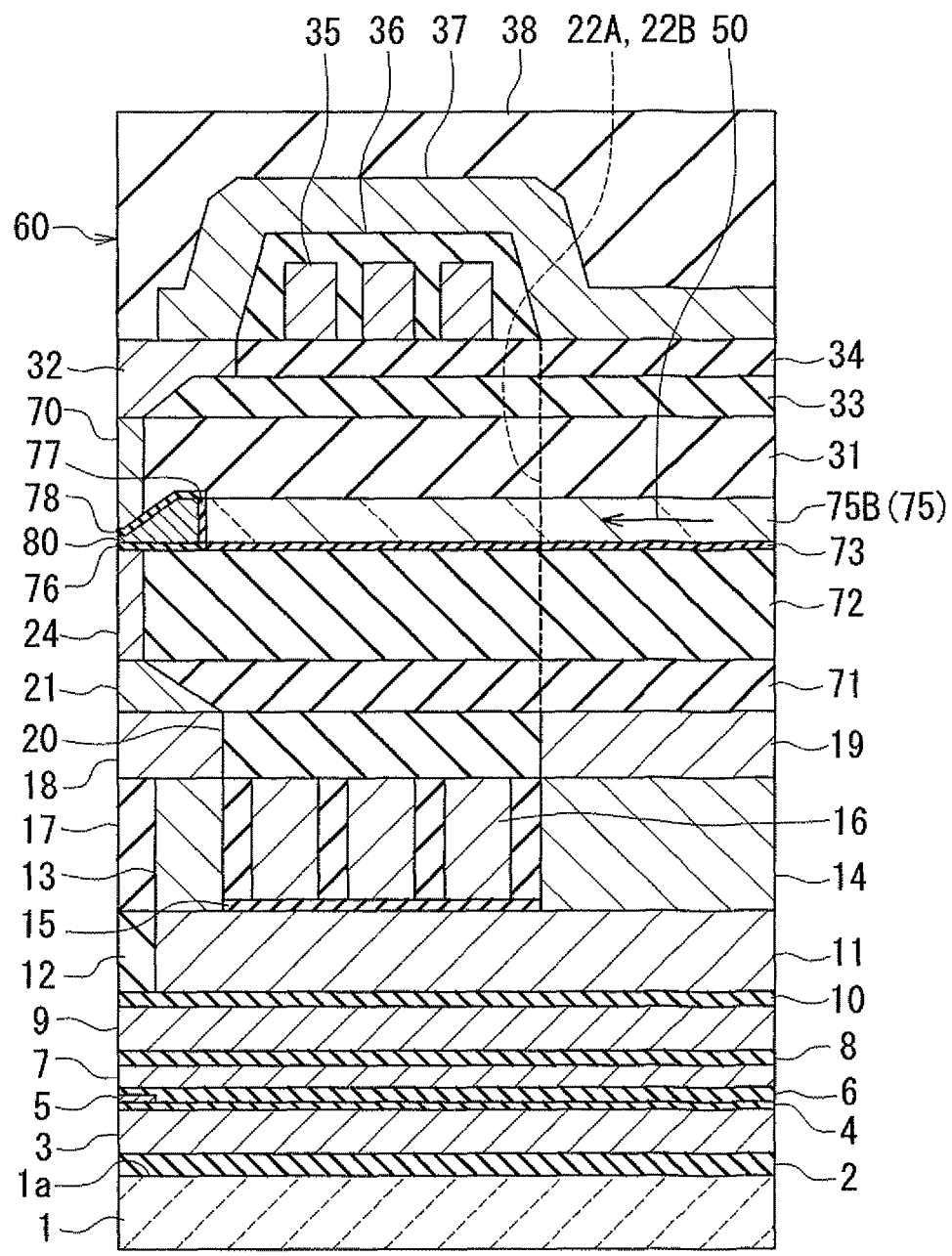
FIG. 21 is a cross-sectional view showing the configuration of the thermally-assisted magnetic recording head according to the fifth embodiment of the invention.
Figure 22:
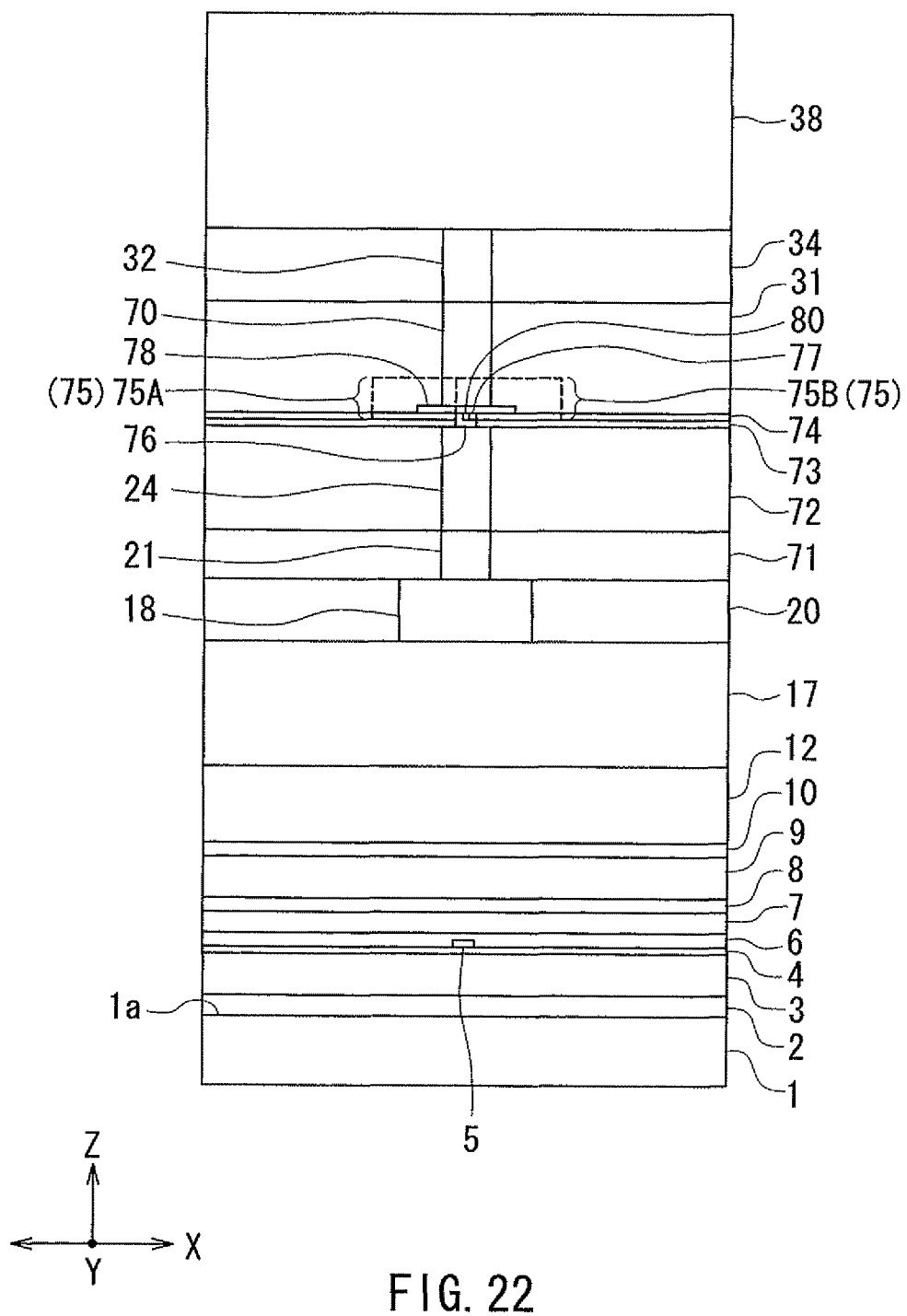
FIG. 22 is a front view showing the medium facing surface of the thermally-assisted magnetic recording head according to the fifth embodiment of the invention.

A thermally-assisted magnetic recording head according to a fifth embodiment of the invention will now be described with reference to FIG. 18 to FIG. 22. FIG. 18 is a perspective view showing the main part of the thermally-assisted magnetic recording head. FIG. 19 is a plan view showing the main part of the thermally-assisted magnetic recording head. FIG. 20 is a cross-sectional view showing a cross section taken at the position indicated by line 20-20 of FIG. 19. FIG. 21 is a cross-sectional view showing the configuration of the thermally-assisted magnetic recording head. FIG. 22 is a front view showing the medium facing surface of the thermally-assisted magnetic recording head.

The configuration of the thermally-assisted magnetic recording head according to the present embodiment differs from that of the head according to the first embodiment as follows. The thermally-assisted magnetic recording head according to the present embodiment has a main pole 70 in place of the main pole 30 of the first embodiment, a plasmon generator 80 in place of the plasmon generator 40, and dielectric films 76 and 77 and a dielectric layer 78 in place of the dielectric layers 27, 28 and 29. Further, in the present embodiment, the waveguide has a core 75 in place of the core 25. The cladding of the waveguide includes cladding layers 73 and 74 in place of the cladding layers 23 and 26.

The core 75 is made of the same material as the core 25 mentioned in the description of the first embodiment, the plasmon generator 80 is made of the same material as the plasmon generator 40 mentioned in the description of the first embodiment, and the cladding layers 73 and 74, the dielectric films 76 and 77 and the dielectric layer 78 are made of the same material as the cladding layers 23, 26, 31 and 33 and the dielectric layers 27 to 29 mentioned in the description of the first embodiment.

Further, the thermally-assisted magnetic recording head according to the present embodiment includes insulating layers 71 and 72. The insulating layer 71 lies on the coupling layer 19 and the insulating layer 20 and surrounds the coupling layer 21. The insulating layer 72 lies on the insulating layer 71 and surrounds the shield layer 24. The top surfaces of the shield layer 24 and the insulating layer 72 are even with each other. In the present embodiment, the first layers of the coupling portions 22A and 22B are embedded in the insulating layer 71. The second layers of the coupling portions 22A and 22B are embedded in the insulating layer 72. The insulating layers 71 and 72 are made of alumina, for example.

The main pole 70 is disposed above the shield layer 24. The main pole 70 has a front end face located in the medium facing surface 60, a rear end face opposite to the front end face, a bottom surface, and a top surface. The rear end face of the main pole 70 is parallel to the medium facing surface 60. The distance from the medium facing surface 60 to an arbitrary point on the bottom surface of the main pole 70 increases with increasing distance from the arbitrary point to the top surface 1a of the substrate 1. The top surface of the main pole 70 is in contact with the bottom surface of the coupling layer 32. The plasmon generator 80 is located between the shield layer 24 and the main pole 70. The plasmon generator 80 is plate-shaped. The width of the plasmon generator 80 in the direction parallel to the medium facing surface 60 and to the top surface 1a of the substrate 1 (the X direction) is generally constant regardless of the distance from the medium facing surface 60.

The cladding layer 73 is disposed over the shield layer 24 and the insulating layer 72. The cladding layer 73 has an opening for exposing part of the top surface of each of the shield layer 24 and the insulating layer 72. The plasmon generator 80 is disposed above the opening of the cladding layer 73. The planar shape (the shape as viewed from above) of the opening of the cladding layer 73 is larger than the planar shape of the plasmon generator 80 and the periphery thereof is shaped along the periphery of the planar shape of the plasmon generator 80.

The core 75 is located on the cladding layer 73. The core 75 includes a first layer 75A and a second layer 75B. The first layer 75A and the second layer 75B are aligned along the track width direction (the X direction). In the vicinity of the medium facing surface 60, the first layer 75A and the second layer 75B are located on opposite sides of the opening of the cladding layer 73 in the track width direction (the X direction). The cladding layer 74 is located on the cladding layer 73 and surrounds the first layer 75A and the second layer 75B.

The dielectric film 76 is interposed between the plasmon generator 80 and each of the shield layer 24, the insulating layer 72 and the first layer 75A. The dielectric film 76 includes a first gap part 76A interposed between the first layer 75A and the plasmon generator 80. The dielectric film 77 is interposed between the second layer 75B and each of the plasmon generator 80 and the dielectric film 76. The dielectric film 77 constitutes a second gap part 77A interposed between the second layer 75B and the plasmon generator 80. The first gap part 76A, the plasmon generator 80, and the second gap part 77A are interposed between the first layer 75A and the second layer 75B. The dielectric layer 78 is disposed on the core 75, the plasmon generator 80 and the dielectric films 76 and 77.

The main pole 70 is disposed on the dielectric layer 78. In the present embodiment, the cladding layer 31 is disposed over the core 75 (the first layer 75A and the second layer 75B), the cladding layer 74 and the dielectric layer 78 and surrounds the main pole 70. The cladding layer 33 lies on the cladding layer 31. The third layers of the coupling portions 22A and 22B are embedded in the cladding layers 73, 74 and 31. The third layer of the coupling portion 22A and the third layer of the coupling portion 22B are located on opposite sides of the core 75 in the track width direction and are each spaced from the core 75.

The shapes and locations of the core 75, the plasmon generator 80 and the dielectric films 76 and 77 will now be described in more detail. As shown in FIG. 18 and FIG. 19, the first layer 75A of the core 75 has an end face 75Aa located in the medium facing surface 60, a top surface 75Ab, a bottom surface 75Ac, and two side surfaces 75Ad and 75Ae. In the vicinity of the medium facing surface 60, the side surface 75Ae is located directly above the edge of the opening in the top surface of the cladding layer 75. The dielectric film 76 is disposed to extend along the side surface 75Ae of the first layer 75A, the wall face of the opening of the cladding layer 73 and the top surfaces of the shield layer 24 and the insulating layer 72.

As shown in FIG. 18 and FIG. 19, the second layer 75B of the core 75 has an end face 75Ba located in the medium facing surface 60, a top surface 75Bb, a bottom surface 75Bc, and two side surfaces 75Bd and 75Be. The side surface 75Bd of the second layer 75B includes a front portion and a rear portion, the front portion being located closer to the medium facing surface 60. The rear portion is located away from the medium facing surface 60 and in contact with the side surface 75Ae of the first layer 75A. The front portion is located directly above the edge of the opening in the top surface of the cladding layer 73, and is farther from the side surface 75Ae than is the rear portion by a distance created by the width of the opening of the cladding layer 73 in the track width direction (the X direction). The dielectric film 77 is disposed to extend along the front portion of the side surface 75Bd of the second layer 75B.

The side surface 75Ae of the first layer 75A includes a first evanescent light generating surface 75Ae1 that generates first evanescent light based on the light propagating through the core 75. The side surface 75Bd of the second layer 75B includes a second evanescent light generating surface 75Bd1 that generates second evanescent light based on the light propagating through the core 75. The first and second evanescent light generating surfaces 75Ae1 and 75Bd1 are disposed such that the plasmon generator 80 is interposed therebetween. Since the first layer 75A and the second layer 75B are portions of the core 75, the core 75 can be said to include the first and second evanescent light generating surfaces 75Ae1 and 75Bd1.

As shown in FIG. 18 and FIG. 19, the plasmon generator 80 has an outer surface. The outer surface includes a front end face 80a located in the medium facing surface 60, a bottom surface 80b, a top surface 80c, a first plasmon exciting part 80d serving as a first side surface, a second plasmon exciting part 80e serving as a second side surface, and a rear end face 80f. The bottom surface 80b extends substantially perpendicularly to the medium facing surface 60. The first plasmon exciting part 80d is opposed to the first evanescent light generating surface 75Ae1 with a predetermined spacing therebetween. The second plasmon exciting part 80e is opposed to the second evanescent light generating surface 75Bd1 with a predetermined spacing therebetween.

The first gap part 76A is interposed between the first evanescent light generating surface 75Ae1 and the first plasmon exciting part 80d. The second gap part 77A is interposed between the second evanescent light generating surface 75Bd1 and the second plasmon exciting part 80e. The first evanescent light generating surface 75Ae1, the first gap part 76A, the first plasmon exciting part 80d, the second plasmon exciting part 80e, the second gap part 77A, and the second evanescent light generating surface 75Bd1 are aligned along the track width direction (the X direction).

Now, with reference to FIG. 20, a description will be made as to the shape of the exciting-part cross section, i.e., a cross section of the plasmon generator 80 parallel to the front end face 80a, the cross section having a periphery defined in part by the first and second plasmon exciting parts 80d and 80e. The exciting-part cross section is in the shape of a quadrangle defined by a first side E1, a second side E2, a third side E3, and a fourth side E4, to be described below. The first side E1 is defined in its entirety by the first plasmon exciting part 80d. The second side E2 is defined in its entirety by the second plasmon exciting part 80e. The third side E3 connects between one end of the first side E1 and one end of the second side E2. The fourth side E4 connects between the other end of the first side E1 and the other end of the second side E2. In the present embodiment, the exciting-part cross section is in the shape of a rectangle, in particular.

As shown in FIG. 18, the plasmon generator 80 includes a narrow portion 81 that is located in the vicinity of the medium facing surface 60 and a wide portion 82 that is located farther from the medium facing surface 60 than is the narrow portion 81. The narrow portion 81 has a front end face located in the medium facing surface 60. The front end face of the narrow portion 81 also serves as the front end face 80a of the plasmon generator 80. In the narrow portion 81, the dimension in the Z direction of each of the first and second plasmon exciting parts 80d and 80e may be constant regardless of the distance from the medium facing surface 60 or may decrease with increasing proximity to the medium facing surface 60. The wide portion 82 is located on a side of the narrow portion 81 farther from the front end face 80a and is coupled to the narrow portion 81. In the wide portion 82, the dimension in the Z direction of each of the first and second plasmon exciting parts 80d and 80e is the same as that in the narrow portion 81 at the boundary between the narrow portion 81 and the wide portion 82, and increases with increasing distance from the narrow portion 81.

The width (the dimension in the track width direction (the X direction)) of the front end face 80a is defined by the width of the narrow portion 81 in the medium facing surface 60. The height (the dimension in the Z direction) of the front end face 80a is defined by the height of the narrow portion 81 in the medium facing surface 60. For example, the width and height of the front end face 80a are the same as those of the front end face 40a mentioned in the description of the first embodiment.

In the vicinity of the medium facing surface 60, the thickness (the dimension in the Z direction) of the core 75 (the first layer 75A and the second layer 75B) is approximately equal to that of the plasmon generator 80. In an area away from the medium facing surface 60, the thickness of the core 75 may be greater than the maximum thickness of the plasmon generator 80.

Now, the principle of generation of near-field light in the present embodiment will be described in detail. Laser light emitted from a laser diode (not shown) enters the core 75. As shown in FIG. 21, the laser light 50 propagates through the core 75 toward the medium facing surface 60, and reaches the vicinity of the plasmon generator 80. The first and second evanescent light generating surfaces 75Ae1 and 75Bd1 of the core 75 each generate evanescent light based on the laser light 50 propagating through the core 75. More specifically, when the laser light 50 is totally reflected at the first evanescent light generating surface 75Ae1, the first evanescent light generating surface 75Ae1 generates first evanescent light permeating into the first gap part 76A. When the laser light 50 is totally reflected at the second evanescent light generating surface 75Bd1, the second evanescent light generating surface 75Bd1 generates second evanescent light permeating into the second gap part 77A. In the plasmon generator 80, a first surface plasmon is excited on the first plasmon exciting part 80d through coupling with the first evanescent light, and a second surface plasmon is excited on the second plasmon exciting part 80e through coupling with the second evanescent light. The first and second surface plasmons propagate to the front end face 80a, and near-field light is generated from the front end face 80a based on the first and second surface plasmons.

In the present embodiment, the laser diode is positioned with respect to the core 75 in such a manner that, for example, both surfaces of the active layer are parallel to the bottom surface 75Ac of the first layer 75A and to the bottom surface 75Bc of the second layer 75B. Here, the laser light emitted from the laser diode is preferably TE-mode polarized light whose electric field oscillates in a direction parallel to both surfaces of the active layer. In this case, the laser light having propagated through the core 75 has an electric field oscillating in a direction perpendicular to the first and second evanescent light generating surfaces 75Ae1 and 75Bd1. This allows the first and second plasmon exciting parts 80d and 80e to excite intense first and second surface plasmons, respectively.

A method of manufacturing the thermally-assisted magnetic recording head according to the present embodiment will now be described. The following description includes the description of a method of manufacturing the near-field light generator according to the present embodiment. The method of manufacturing the near-field light generator according to the present embodiment includes the steps of forming the waveguide, forming the dielectric films 76 and 77 and the dielectric layer 78, and forming the plasmon generator 80. The step of forming the waveguide includes the step of forming the core 75 and the step of forming the cladding layers 73, 74, 31 and 33.

In the method of manufacturing the thermally-assisted magnetic recording head according to the present embodiment, the parts from the insulating layer 2 to the shield layer 24, the insulating layer 72 and the second layers of the coupling portions 22A and 22B are first formed on the top surface 1a of the substrate 1 in due order of succession. The cladding layer 73 is then formed over the entire top surface of the stack. Next, the first layer 75A of the core 75 is formed on the cladding layer 73. The cladding layer 73 is then selectively etched to form therein an opening for exposing part of the top surface of each of the shield layer 24 and the insulating layer 72. The side surface 75Ae of the first layer 75A defines the position of an edge of the opening of the cladding layer 73 closer to the first layer 75A.

Next, the dielectric film 76 is formed to extend along the top surface 75Ab and the side surface 75Ae of the first layer 75A, the wall face of the opening of the cladding layer 73, and the top surfaces of the shield layer 24 and the insulating layer 72. Next, a metal film that is to later become the plasmon generator 80 is formed to extend along the surface of the dielectric film 76. The metal film is then selectively etched such that a portion of the metal film located opposite from the side surface 75Ae of the first layer 75A with the dielectric layer 76 interposed therebetween remains whereas another portion of the metal film located opposite from the top surfaces of the shield layer 24 and the insulating layer 72 with the dielectric film 76 interposed therebetween is removed. Next, the dielectric film 77 is formed to extend along the surfaces of the dielectric film 76 and the metal film.

Next, the dielectric film 77 is selectively etched such that a portion of the dielectric film 77 located opposite from the side surface 75Ae of the first layer 75A with the dielectric film 76 and the metal film interposed therebetween remains whereas another portion of the dielectric film 77 located opposite from the top surfaces of the shield layer 24 and the insulating layer 72 with the dielectric film 76 interposed therebetween is removed. If the dielectric films 76 and 77 also include portions formed on the cladding layer 73, the etching is carried out to remove also the portions of the dielectric films 76 and 77 formed on the cladding layer 73.

Next, the second layer 75B of the core 75 is formed on the cladding layer 73. The second layer 75B is formed such that the side surface 75Bd thereof is in contact with the surface of the dielectric film 77 and the side surface 75Ae of the first layer 75A. Next, the cladding layer 74 is formed to cover the first layer 75A and the second layer 75B. The metal film, the dielectric films 76 and 77, and the cladding layer 74 are then polished by, for example, CMP, until the first layer 75A and the second layer 75B are exposed. Then, the metal film, the dielectric films 76 and 77, the first layer 75A, the second layer 75B, and the cladding layer 74 are taper-etched in part in the vicinity of the position at which the medium facing surface 60 is to be formed. This makes the metal film into the plasmon generator 80.

Next, the dielectric layer 78 is formed over the core 75 (the first layer 75A and the second layer 75B), the plasmon generator 80 and the dielectric films 76 and 77. The main pole 70 is then formed on the dielectric layer 78. Then, the cladding layers 73 and 74 are selectively etched to form therein two openings for exposing the second layers of the coupling portions 22A and 22B. The third layers of the coupling portions 22A and 22B are then formed on the second layers thereof. Note that the main pole 70 may be formed after the formation of the third layers of the coupling portions 22A and 22B. Next, the cladding layer 31 is formed to cover the main pole 70 and the third layers of the coupling portions 22A and 22B. The cladding layer 31 is then polished by, for example, CMP, until the main pole pole 70 and the third layers of the coupling portions 22A and 22B are exposed. The subsequent steps are the same as those in the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the shapes and locations of the core of the waveguide, the plasmon generator, and the main pole can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generator comprising:
a waveguide including a core through which light propagates, and a cladding provided around the core;
a first gap part and a second gap part each made of a dielectric material that has a refractive index lower than that of the core; and
a plasmon generator, wherein:
the core has a first evanescent light generating surface and a second evanescent light generating surface that are disposed such that the plasmon generator is interposed therebetween;
the first evanescent light generating surface generates first evanescent light based on the light propagating through the core;
the second evanescent light generating surface generates second evanescent light based on the light propagating through the core;
the plasmon generator has an outer surface, the outer surface including: a front end face; a first plasmon exciting part that is opposed to the first evanescent light generating surface with a predetermined spacing therebetween; and a second plasmon exciting part that is opposed to the second evanescent light generating surface with a predetermined spacing therebetween;
the first gap part is interposed between the first evanescent light generating surface and the first plasmon exciting part;
the second gap part is interposed between the second evanescent light generating surface and the second plasmon exciting part;
the plasmon generator is configured so that a first surface plasmon is excited on the first plasmon exciting part through coupling with the first evanescent light, a second surface plasmon is excited on the second plasmon exciting part through coupling with the second evanescent light, the first and second surface plasmons propagate to the front end face, and near-field light is generated from the front end face based on the first and second surface plasmons;
a cross section of the plasmon generator parallel to the front end face, the cross section having a periphery defined in part by the first and second plasmon exciting parts, is in the shape of a quadrangle that is made up of a first side, a second side, a third side, and a fourth side; and
the first side is defined in its entirety by the first plasmon exciting part, the second side is defined in its entirety by the second plasmon exciting part, the third side connects between one end of the first side and one end of the second side, and the fourth side connects between the other end of the first side and the other end of the second side.

2. The near-field light generator according to claim 1, wherein the cross-section of the plasmon generator is in the shape of a rectangle.

3. The near-field light generator according to claim 1, wherein:
the core includes a first layer including the first evanescent light generating surface and a second layer including the second evanescent light generating surface; and
the first gap part, the plasmon generator, and the second gap part are interposed between the first layer and the second layer.

4. A thermally-assisted magnetic recording head comprising:
a medium facing surface that faces a recording medium;
a main pole that has an end face located in the medium facing surface and produces a write magnetic field for writing data on the recording medium; and
the near-field light generator according to claim 1,
wherein the front end face of the outer surface of the plasmon generator is located in the medium facing surface.

5. The thermally-assisted magnetic recording head according to claim 4, wherein the cross-section of the plasmon generator is in the shape of a rectangle.

6. The thermally-assisted magnetic recording head according to claim 4, wherein the first evanescent light generating surface, the first gap part, the first plasmon exciting part, the second plasmon exciting part, the second gap part, and the second evanescent light generating surface are aligned along a direction of travel of the recording medium.

7. The thermally-assisted magnetic recording head according to claim 4, wherein the first evanescent light generating surface, the first gap part, the first plasmon exciting part, the second plasmon exciting part, the second gap part, and the second evanescent light generating surface are aligned along a track width direction.

8. The thermally-assisted magnetic recording head according to claim 4, wherein:
the core includes a first layer including the first evanescent light generating surface and a second layer including the second evanescent light generating surface; and
the first gap part, the plasmon generator, and the second gap part are interposed between the first layer and the second layer.

9. The thermally-assisted magnetic recording head according to claim 8, wherein the first layer and the second layer are aligned along a direction of travel of the recording medium, and at least part of the main pole is located between the medium facing surface and one of the first and second layers.

* * * * *